US010859396B2

(12) United States Patent
Stenneth

(10) Patent No.: US 10,859,396 B2
(45) Date of Patent: Dec. 8, 2020

(54) WARNING POLYGONS FOR WEATHER FROM VEHICLE SENSOR DATA

(71) Applicant: HERE Global B.V., Eindhoven (NL)

(72) Inventor: Leon Stenneth, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 80 days.

(21) Appl. No.: 15/983,260

(22) Filed: May 18, 2018

(65) Prior Publication Data

US 2019/0353499 A1 Nov. 21, 2019

(51) Int. Cl.
*G01C 21/36* (2006.01)
*G05D 1/02* (2020.01)
(Continued)

(52) U.S. Cl.
CPC ....... *G01C 21/3694* (2013.01); *G05D 1/0274* (2013.01); *G06F 3/04817* (2013.01); *G06K 9/00791* (2013.01); *G06T 11/203* (2013.01)

(58) Field of Classification Search
CPC ....... G06T 11/203; G06T 11/20; G06K 15/00; G06K 9/00; G06K 9/00664; G06K 9/00671; G06K 9/00684; G06K 9/00697; G06K 9/00711; G06K 9/00718; G06K 9/00744; G06K 9/00791; G06K 9/52; G06F 3/00; G06F 3/048; G06F 3/0481; G06F 3/04812; G06F 3/04815; G06F 3/0482;
(Continued)

(56) References Cited

U.S. PATENT DOCUMENTS

| | | | | |
|---|---|---|---|---|
| 5,119,002 A | * | 6/1992 | Kato | B60S 1/0818 318/444 |
| 6,603,405 B2 | * | 8/2003 | Smith | G08G 1/0962 340/601 |

(Continued)

FOREIGN PATENT DOCUMENTS

| | | |
|---|---|---|
| DE | 102012004998 A1 | 7/2013 |
| GB | 2485581 A | 11/2013 |
| JP | 2015163858 A | 9/2015 |

OTHER PUBLICATIONS

European Search Report for European Patent Application No. 19175209.6-1003 dated Oct. 18, 2019.
(Continued)

*Primary Examiner* — Anthony R Jimenez
(74) *Attorney, Agent, or Firm* — Lempia Summerfield Katz LLC

(57) ABSTRACT

An apparatus is configured to perform a method for generating warning polygons for weather events in a geographic region. The method includes receiving measurement data from one or more sensors, identifying at least one location from the measurement data, identifying a map tile within a predetermined distance to the at least one location, defining an index including the map tile in response to identification that the map tile is within the predetermined distance to the at least one location, calculating a confidence level for the map tile accessed from the index, comparing the confidence level for the map tile to a threshold confidence level, clustering the map tile in a map tile cluster in response to the confidence level exceeding the threshold level, and calculating a polygon based on the map tile cluster such that the polygon intersects the geographic region.

19 Claims, 19 Drawing Sheets

(51) Int. Cl.
*G06F 3/0481* (2013.01)
*G06K 9/00* (2006.01)
*G06T 11/20* (2006.01)

(58) Field of Classification Search
CPC ........ G06F 3/04817; G05D 3/00; G05D 3/12;
G05D 1/02; G05D 1/027; G05D 1/0268;
G05D 1/0276; G05D 1/0278; G05D
1/0274; G05D 1/0285; G05D 1/0287;
G05D 1/028; G01C 21/36; G01C
21/3602; G01C 21/3614; G01C 21/3623;
G01C 21/3626; G01C 21/3632; G01C
21/3635; G01C 21/365; G01C 21/3682;
G01C 21/36888; G01C 21/3691; G01C
21/3694; G01C 21/3697
See application file for complete search history.

(56) References Cited

U.S. PATENT DOCUMENTS

| | | | |
|---|---|---|---|
| 9,212,921 | B1 | 12/2015 | Sisbot et al. |
| 9,401,089 | B2 | 7/2016 | Drobot et al. |
| 9,810,811 | B2 | 11/2017 | Marshall et al. |
| 9,812,011 | B1 | 11/2017 | Stenneth et al. |
| 9,874,450 | B2 | 1/2018 | Vakharia |
| 9,933,548 | B1 | 4/2018 | Stenneth et al. |
| 2004/0080430 | A1* | 4/2004 | Videtich ............ G08G 1/09675 340/905 |
| 2014/0018106 | A1 | 1/2014 | Fulger et al. |
| 2017/0098373 | A1 | 4/2017 | Filley et al. |

OTHER PUBLICATIONS

European Search Report for European Patent Application No. 19175209.6-1001 dated Feb. 13, 2020.

* cited by examiner

WARNING POLYGONS FOR WEATHER FROM VEHICLE SENSOR DATA

FIELD

The following disclosure relates to the calculation of polygons for geographic areas corresponding to weather events from vehicle sensor data.

BACKGROUND

Driving conditions change very quickly. The path of a rain storm, fog, or other weather conditions moves across different roadways in a geographic area in different ways and in different coverage areas. These weather conditions can be hazardous to drivers. The weather conditions may be detected by sensors at some vehicles. Warnings may be provided to other vehicles. When warnings can be delivered to drivers, the drivers can prepare for the upcoming conditions. Drivers may choose to slow down, change lanes, exit the road, or stop on the shoulder. Safety is improved, and accidents are avoided.

Warnings are delivered to drivers via connected navigation systems and can be displayed on the head unit screen, cluster screen or a heads-up display. The affected region for the warnings may also be rendered at the vehicle navigation system. However, with limited computing resources, the navigation system can be improved with more efficient rendering of the affected region.

SUMMARY

In one embodiment, a method for generating warning polygons for weather events in a geographic region includes receiving measurement data from one or more sensors associated with the geographic region, identifying at least one location from the measurement data, identifying at least one map tile within a predetermined distance to the at least one location, defining an index including the at least one map tile in response to identification that the at least one map tile is within the predetermined distance to the at least one location, calculating, by a processor, a confidence level for the at least one map tile accessed from the index, comparing, by the processor, the confidence level for the at least one map tile to a threshold confidence level, clustering the at least one map tile in a map tile cluster in response to the confidence level exceeding the threshold confidence level, and calculating, by the processor, a polygon based on the map tile cluster, wherein the polygon intersects the geographic region.

In one embodiment, an apparatus for generating warning polygons for weather events in a geographic region includes a map tile database, an input, a map tile activator, and a controller. The map tile database configured to store partitions of map data according to an index of a plurality of map tile identifiers. The input configured to receive measurement data from one or more sensors associated with the geographic region. The map tile activator configured to identify at least one location from the measurement data and activate at least one map tile within a predetermined distance to the at least one location, wherein the activated at least one map data tile is indexed using a corresponding one of the plurality of map tile identifiers. The controller configured to calculate a confidence level for the at least one map tile accessed from the index and calculate a polygon for a weather event in response to the confidence level, wherein the polygon for the weather event intersects the geographic region.

In one embodiment, a non-transitory computer readable medium including instructions that when executed cause a processor to perform detecting, from a first sensor, location data for a geographic location of a vehicle, detecting, from a second sensor, measurement data associated with the vehicle, sending, to a centralized device, a weather event message including the location data and the measurement data, receiving a weather event polygon from the centralized device, and providing a driving message to the vehicle in response to the weather event polygon.

BRIEF DESCRIPTION OF THE DRAWINGS

Exemplary embodiments of the present invention are described herein with reference to the following drawings.

DETAILED DESCRIPTION

Figure 1:
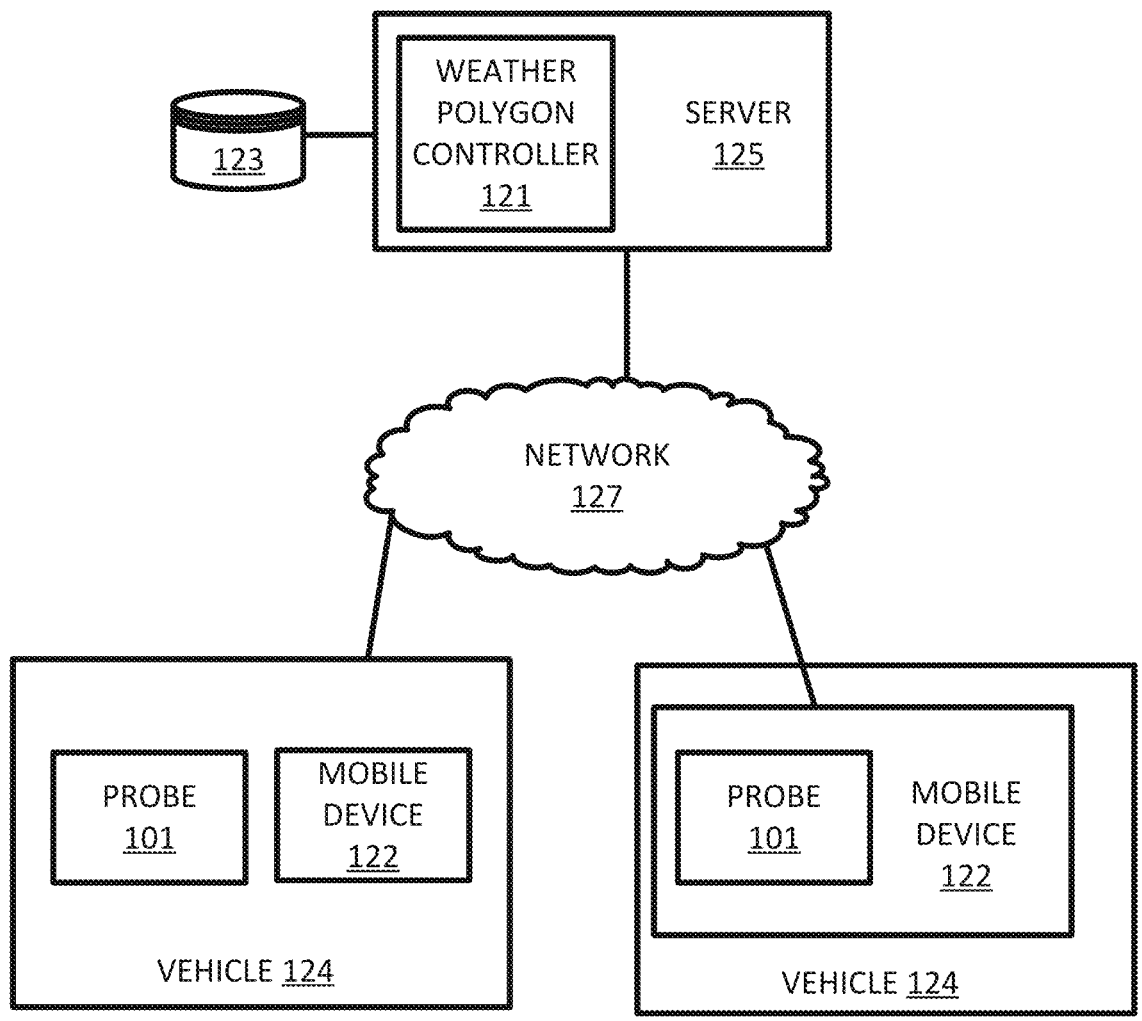
FIG. 1 illustrates an example system for generating weather polygons from vehicle observations.

Driving hazards, or driving conditions, may be communicated to drivers or automated driving systems based on data observations collected by other vehicles. The observations may be collected by pedestrians or other mobile devices in other scenarios. The driving conditions may be presented as a geometric shape on a geographic map that illustrates the affected area. Alternatively, the driving conditions may be communicated using a displayed or audible warning of an area affected. While traveling in the affected area, the warning may be repeated. The user may view the map to recognize the driving condition and adjust operation of the vehicle according. The driver may choose to drive more slowly, pay closer attention, activate one or more system to accommodate the condition, stop driving, change lanes, change roadways, or another response. An automated driving system may response to the driving condition with similar responses.

Example driving conditions may include rain, fog, precipitation, snow conditions, ice conditions, or other weather events. Vehicle observations of these weather events, even when sparse date, may reliably detect the region that is affected by the hazards. For example, to detect precipitation, vehicle observations of wiper blade status signals may be sufficient to detect the coverage area of precipitation. In another example, to detect fog, vehicle observations of fog lights (e.g., rear fog lights) may be sufficient to detect the coverage area of the fog.

There are several problems in the technological fields of navigation, automated driving, and automatic vehicle safety mechanisms that are solved in the following embodiments. The problem of creating area events to represent these weather events including fog and rain from vehicle sensor data is challenging due to several reasons.

The vehicle observations are very sparse because not all vehicles are connected and can report their sensor data. Fewer data points means that the geographic area affected by the weather condition is harder to detect. The following embodiments improve the technological fields of navigation, automated driving, and automatic vehicle safety mechanisms by reliably detecting weather events even with sparse observation data. Using specifically tailored confidence level analysis and clustering techniques, reliable results are obtained from sparse data.

In addition, analyzing data for all geographic regions is a computationally burdensome task. Using map tiles at a level appropriate for these geographic warnings results in millions of tiles to process worldwide. The following embodiments improve the technological fields of navigation, automated driving, and automatic vehicle safety mechanisms by establishing a specially tailored pre-activation technique that selects a subset of map tiles for analysis, which reduces the total amount of data to be analyzed worldwide, or for any specific geographic area.

The affected region that is represented by a polygon aims to be displayed in the vehicle navigation system. However, the vehicle navigation system has limited computing power. Thus, we want the polygons to have as few edges as possible and be constructed from as few calculations as possible. The following embodiments improve the technological fields of navigation, automated driving, and automatic vehicle safety mechanisms by reducing the number of calculations and computing resources needed to construct polygons for the driving condition warnings.

Finally, there are latencies in the delivery channel that delivers the warnings to the vehicles that may be further slowed by complex calculations. The following embodiments improve the technological fields of navigation, automated driving, and automatic vehicle safety mechanisms by simplifying the calculations for the polygons for driving condition warnings, which results in a reduced latency in the communication to the vehicles (drivers and automated driving systems). When the data reaches the vehicles more quickly, safety is improved. With more time to react to the driving conditions, drivers or automated driving system reduce the risk of an accident related to the driving condition.

FIG. 1 illustrates an example system for generating weather polygons from vehicle observations. A weather polygon indicates the geographic location or area affected by a weather condition. The weather polygon may be represented graphically, for example, overlaid on a map such that the polygon is drawn over the area affected by the weather condition. The weather polygon may be represented by a set of vertices or other geographic coordinates that describes the relationship between the polygon and the map.

In FIG. 1, one or more vehicles 124 are connected to the server 125 though the network 127. The vehicles 124 may be directly connected to the server 125 or through an associated mobile device 122. A map developer system, including the server 125 and a geographic database 123, exchanges (e.g., receives and sends) data from the vehicles 124. The server 125 may include a weather polygon controller 121 configured to generate polygons or designated geographic areas for weather events based on crowdsourced data from the vehicles 124.

Each vehicle 124 and/or mobile device 122 may include position circuitry such as one or more processors or circuits for generating probe data. The probe data may be generated by receiving global navigation satellite system (GNSS) signals and comparing the GNSS signals to a clock to determine the absolute or relative position of the vehicle 124 and/or mobile device 122. The probe data may be generated by receiving radio signals or wireless signals (e.g., cellular signals, the family of protocols known as WiFi or IEEE 802.11, the family of protocols known as Bluetooth, or another protocol) and comparing the signals to a pre-stored pattern of signals (e.g., radio map). The mobile device 122 may act as probe 101 for determining the position or the mobile device 122 and the probe 101 may be separate devices.

The mobile devices 122 may include local databases corresponding to a local map, which may be modified according to the server 125. The local map may include a subset of the geographic database 123 and are updated or changed as the vehicles 124 travel. For example, polygons may be downloaded to the local map from the geographic database 123 according to location. The mobile devices 122 may request subset of the geographic database 123 based on the locations detected by position circuitry. The mobile devices 122 may be standalone devices such as smartphones or devices integrated with vehicles. Additional, different, or fewer components may be included.

Figure 2:
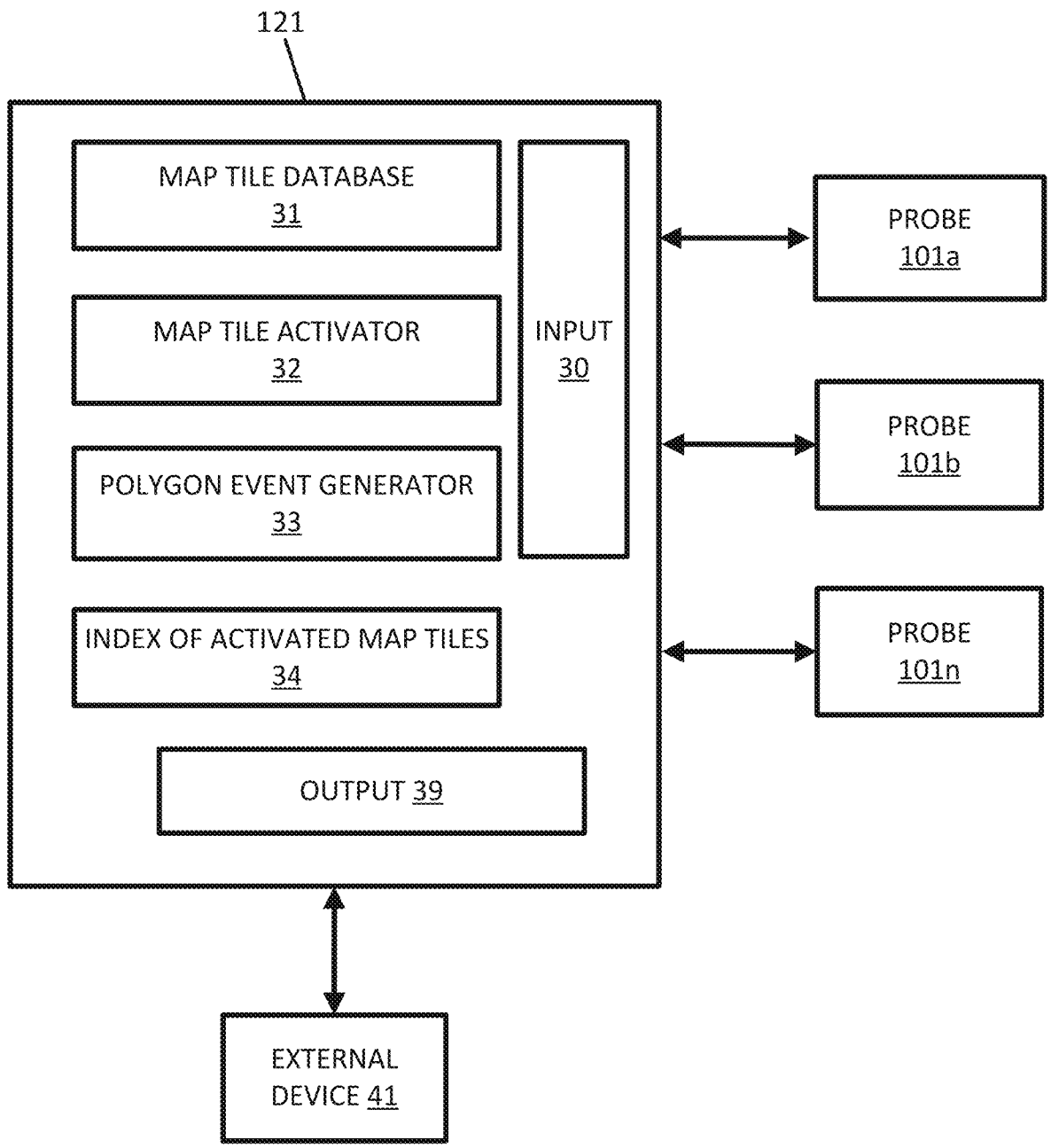
FIG. 2 illustrates an example weather polygon controller.

FIG. 2 illustrates an example weather polygon controller 121. The weather polygon controller 121 may include one or more memory portions, one or more communication portions, and one or more processing portions. Example memory portions include the map tile database 31 and the index of activated map tiles 34. Example communication portions include the input communication device (input 30) for communication with the probes 101a-n and the output communication device (output 39) for communicating with external device 41. Example processing portions include the map tile activator 32, and the polygon generator 35. Additional, different, or fewer components may be included.

Figure 3:
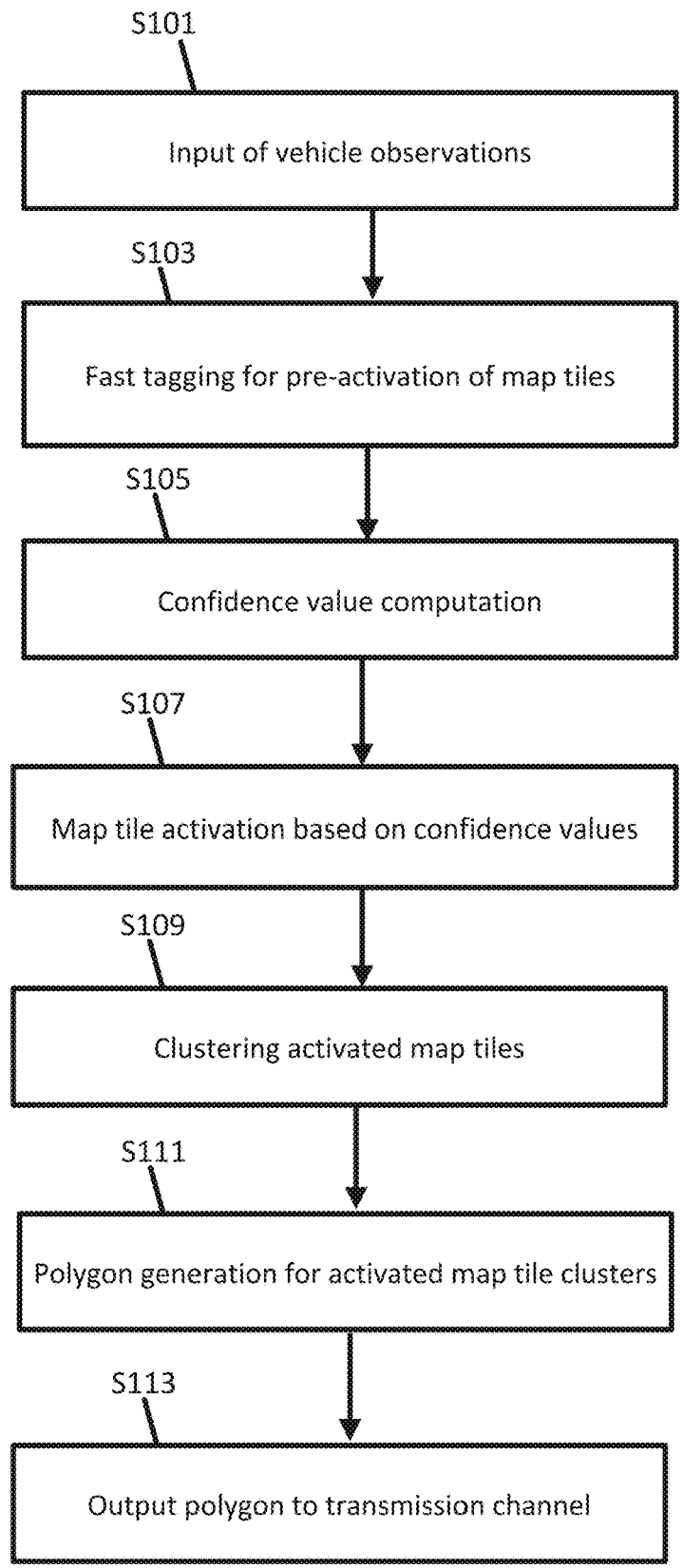
FIG. 3 illustrates an example flowchart for the weather polygon controller of FIG. 2.

FIG. 3 illustrates an example flowchart for the weather polygon controller 121 of FIG. 2 to generate warning polygons for weather events in a geographic region. The acts or stages in FIG. 3 may be performed in any order. Certain acts or stages may be performed in parallel. Certain acts or stages are performed automatically in response to one or more prior acts or stages. Additional, different, or fewer acts or stages may be included.

At act S101, the weather polygon controller 121 may receive the input of vehicle observations from probes 101a-n. The vehicle observations may be measurement data as the data collected by the sensors or conditioned data after some processing of the data collected by the sensors. The processing of the sensor data may include removal of outliers or noise, filtering of the data, or time sampling the data.

The probe data may include multiple types of data packaged together in messages. The probe data may include sensor data related to a weather event. The weather events may include rain, fog, precipitation, snow conditions, ice conditions, or others. In some examples, the sensor data may be collected by vehicle sensors that detect the ambient environment of the vehicle 124. In other examples, the sensor data may be collected by vehicle sensors that detect the operation of one or more systems or features of the vehicle 124.

For example, a rain sensor may be mounted on the exterior of vehicle 124 to detect rain or other precipitation. The rain sensor may be an optical sensor or a capacitive sensor. The rain sensor may detect drops or particles of precipitation that fall on a plate or a chamber. In another example, data collected by a temperature sensor may be used in combination with the data collected by the rain sensor to infer the type of precipitation (e.g., rain, sleet, snow, ice, etc.). The rain sensor may measure the quantity of the precipitation, the rate of the precipitation, or the intensity of the precipitation.

The weather condition may be inferred from the use of a device, system, or operation of the vehicle 124. Precipitation may be inferred from a windshield wiper sensor or wiper blade sensor that detects when the windshield wipers are running, or at a specific speed or interval. Snow conditions may be inferred from operation of an all-wheel drive or four-wheel drive mode. Ice conditions may be inferred from traction control or anti-lock brakes activation. Fog conditions may be inferred from the operation of fog lights such as rear fog lights. In one example, the headlights, or lights in general, may infer the existence of a reduced visibility event. When the headlights are used, the time of day may limit the associated. For example, the system may detect a limited visibility event when it is daylight (e.g., the current time is between an expect dawn and dusk for the detected geographic location) and the headlights are turned on by the driver of the vehicle, or automatically.

The probe data may also include a geographic location such as a longitude value and a latitude value. In addition, the probe data may include a height or altitude. The probe data may be collected over time and include timestamps. In some examples, the probe data is collected at a predetermined time interval (e.g., every second, ever 100 milliseconds, or another interval). In some examples, the probe data is collected in response to movement by the probe 101 (i.e., the probe reports location information when the probe 101 moves a threshold distance). The predetermined time interval for generating the probe data may be specified by an application or by the user. The interval for providing the probe data from the mobile device 122 to the server 125 may be may the same or different than the interval for collecting the probe data. The interval may be specified by an application or by the user.

The input 30 is in communication with the probes 101*a-n*. The input 30 may include a transceiver or a communication circuit configured to receive communication signals from the probes 101*a-n*. The communication between the vehicles 124 and/or between the mobile device 122 and the server 125 through the network 127 may use a variety of types of wireless networks. Example wireless networks include cellular networks, the family of protocols known as WiFi or IEEE 802.11, the family of protocols known as Bluetooth, or another protocol. The cellular technologies may be analog advanced mobile phone system (AMPS), the global system for mobile communication (GSM), third generation partnership project (3GPP), code division multiple access (CDMA), personal handy-phone system (PHS), and 4G or long term evolution (LTE) standards, 5G, DSRC (dedicated short range communication), or another protocol.

Figure 4:
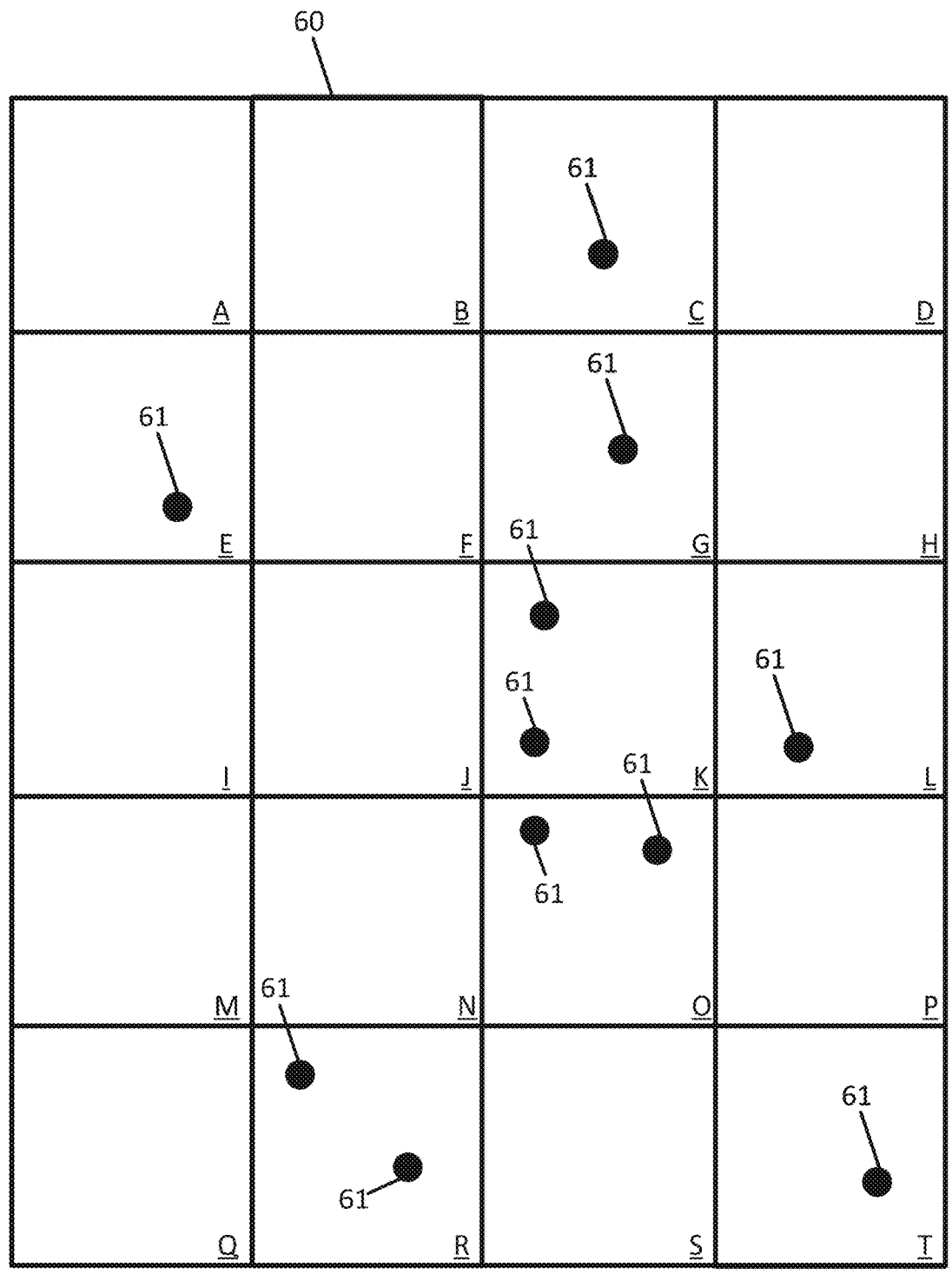
FIG. 4 illustrates an example input stage for the weather polygon controller of FIG. 2.

FIG. 4 illustrates an example input stage for the weather polygon controller of FIG. 2, which corresponds to act S101. FIG. 4 illustrates a set of map tiles 60 for a geographic region. The set of map tiles 60 includes individual map tiles A through T. The map tiles are partitions of map data that may be bounded by geographic distances.

The geographic region may correspond to a political boundary such as a state, a city, a village, a township, or a neighborhood. The larger region may be divided into map tiles have a predetermined size (e.g., 10 square miles) or a predetermined number of degrees or portion of the earth's surface. The map tiles may be defined according to a hierarchical system of different layers such that map tiles in different layers have different sizes. The embodiments herein may be applied to any of the layers or different layers. Example dimensions of the map tiles A through T may be 100 meters, 1 kilometer, 5 kilometers, 10 kilometers, 14 kilometers, or 20 kilometers.

The weather polygon controller 121 through input 30 may receive data for the set of map tiles including a map tile identifier. The map tile identifier may be an alphanumeric code unique to each map tile. The map tile identifier may be indicative of a geographic order of the map tiles such that adjacent map tiles have map tile identifiers that differ by a predetermined amount or increment. The data for the set of map tiles may include geographic coordinates for the borders, edges, or centers of the set of map tiles.

Figure 5:
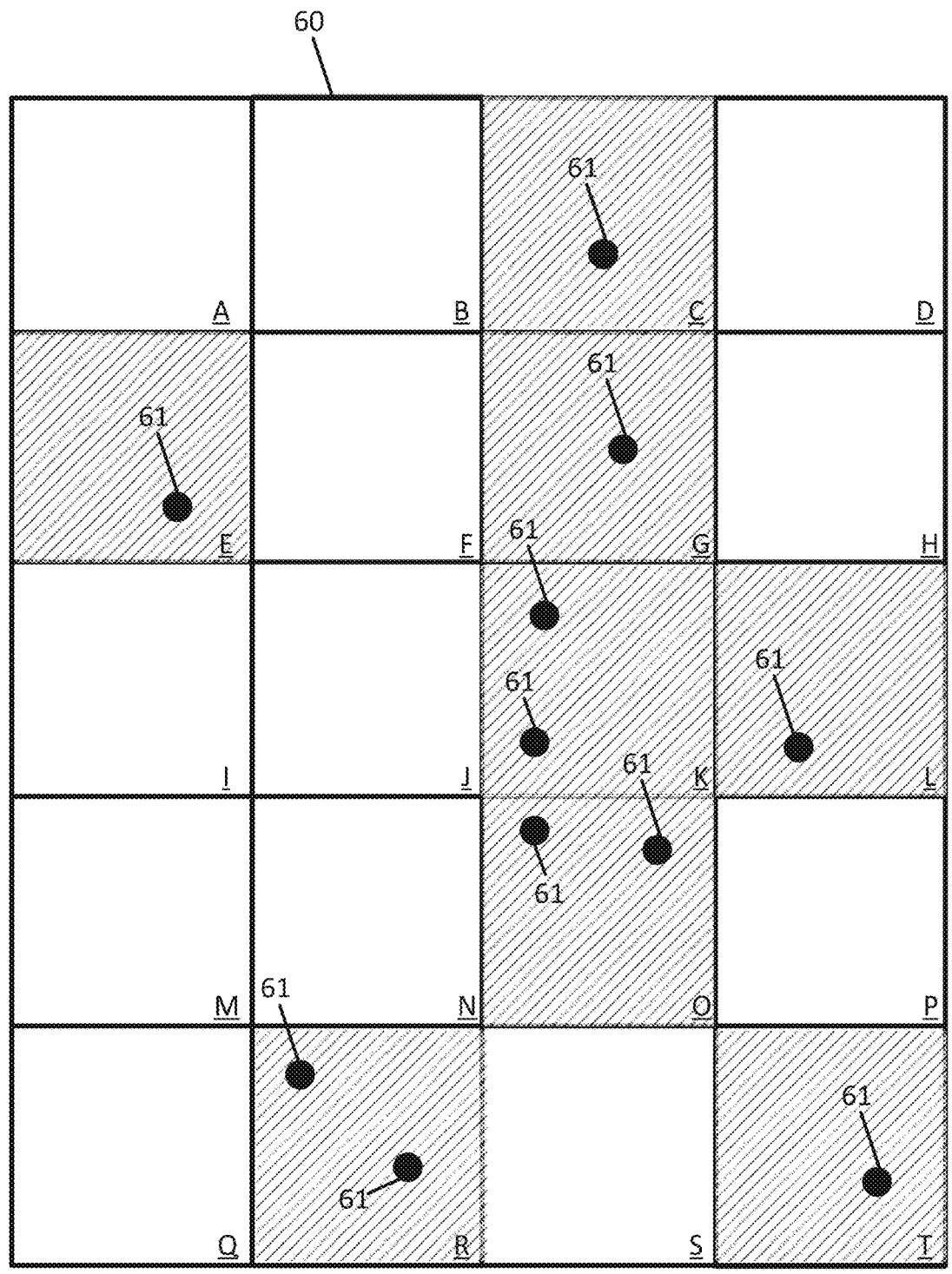
FIG. 5 illustrates an example pre-activation stage for the weather polygon controller of FIG. 2.

FIG. 5 illustrates an example pre-activation stage for the weather polygon controller of FIG. 2. At act S103, the weather polygon controller 121 through map tile activator 32 may perform fast tagging for pre-activation of map tiles. The map tile activator 32 may identify multiple map tiles for activation. The map tile activator 32 may include one or more processors or integrated controllers configured to analyze the sensor data with respect to map tiles. The probe data includes sensor data associated with location data indicative of the location at which the sensor data was collected. In FIG. 5 the subset of the map tiles 60 that includes at least one data measurement are identified or pre-activated. FIG. 5 illustrates a shading for the subset of map tiles, including map tiles A, C, E, G, K, L, O, R, and T.

The pre-activation enables the weather polygon controller 121 to avoid processing all of the map tiles 60. Instead, only the pre-activated tiles are fully processed, which are the tiles that can be affected by the incoming vehicle observations of the weather event. The pre-activated tiles may be the tiles with a measurement observed within the borders of the tile. The pre-activated tiles may be tiles within a predetermined distance of a measurement. The predetermined distance may be 100 meters, 1 kilometer, 5 kilometers, 10 kilometers, 14 kilometers, or 20 kilometers.

The predetermined distance may be selectable by a user. The user may select the predetermined distance to minimize the existence of false positives while maximizing the detection of all weather events. The predetermined distance may be selectable over time. For example, as vehicles 124 or mobile devices 122 report false positives, the predetermined distance may be decreased to reduce the occurrence of false positives. Likewise, as vehicles 124 or mobile devices 122 report weather events that were not detected, the predetermined distance may be increased to activate more map tiles in response to the measured observations.

The predetermined distance may be selected based on other map data. The predetermined distance may be selected according to a terrain feature such as the type of terrain. Mountains may have rapidly changing weather, which is better detected by a smaller predetermined distance for pre-activating the map tiles. Plains or flatter terrain may be associated with a larger predetermined distance for pre-activating the map tiles. The predetermined distance may be selected based on the proximity of a weather impacting body of water. The weather impacting body of water may be a body of water that impacts the weather such as an ocean, sea, or great lake. When the measured observation is within a distance range of a weather impacting body of water, a small predetermined distance is used for pre-activating the map tiles, and when the measured observation is farther than the distance range of a weather impacting body of water, a large predetermined distance is used for pre-activating the map tiles.

A measurement may be within the predetermined distance of multiple map tiles. That is, a single measurement may cause multiple map tiles to be pre-activated. Only the specific tiles that are pre-activated from being near observations are processed further, as described in the subsequent stages. Map tiles that are not pre-activated tiles are not further processed. The pre-activation stage speeds up processing since vehicle observations are sparse and only some of the map tiles are fully processed. The map tile activator 32 may determine which map tiles include measurements or are within the predetermined distance to the measurements. The map tile activator 32 is configured to identify at least one location from the measurement and determine whether each of the map tiles is within a predetermined distance to the at least one location.

The index of activated map tiles 34 specifies whether or not a map tile is pre-activated or tagged for subsequent analysis. The index of activated map tiles 34 may include a data structure that lists the map tiles of a geographic region. The map tiles may be listed by the map tile identifier (e.g., sorted numerically) or by location (e.g., sorted geographically).

The data structure of the index of activated map tiles 34 may include a flag for indicating the map tile identifiers associated with a pre-activated map tile. The map tile activator 32 may insert the flag for some map tiles and remove or omit the flag for some map tiles. The flag may be either on or off, high or low, 1 or 0, with one value indicating that the map tile identifier is pre-activated, and the other indicating that the map tile identifier is not pre-activated. The map tile activator 32 is configured to define an index including the at least one map tile in response to identification that the at least one map tile is within the predetermined distance to the at least one location.

In some embodiments, the pre-activation stage at act S103 may further include an analysis for the removal of false positives. The weather polygon controller 121 may identify patterns in the sensor data, which may be correlated with other sensor data, that are indicative of false positives. In one example, a transient feature of the sensor data may indicate a false positive. For example, if the data indicates that a condition has occurred less than a predetermined amount of time, it may be considered a false positive. For example, when the rain sensor indicates rain for only a few seconds, it may be caused by something other than weather. In another example, when a windshield wiper sensor (or on switch for the windshield wiper) detects the windshield wiper is on for less than the predetermined amount of time, a user may have mistakenly switched on the wiper signal in an attempt to activate a turn signal. In other example, the sensor data may be correlated with other data. For example, reports of heavy rain from the sensor day may be determined to be a false positive when the vehicle is traveling at a high rate of speed (e.g., greater than 100 KPH).

Figure 6:
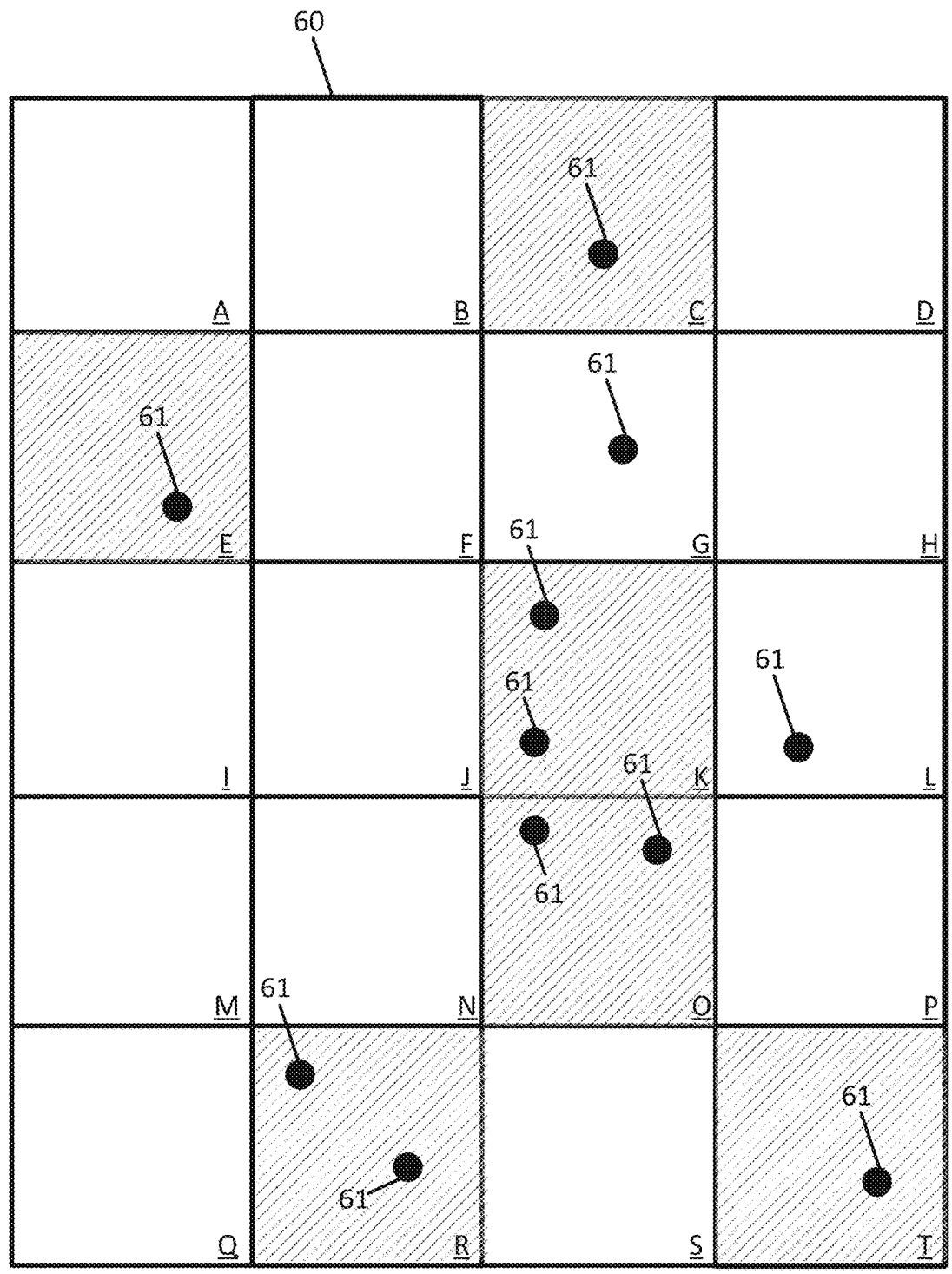
FIG. 6 illustrates an example confidence value stage for the weather polygon controller of FIG. 2.

FIG. 6 illustrates an example confidence value stage for the weather polygon controller of FIG. 2. At act S105, the weather polygon controller 121 through the map tile activator 32 may calculate confidence levels for the map tiles included in the index of activated map tiles 34. In FIG. 6, map tiles G and L and are no longer illustrated and have been de-activated as not meeting the confidence requirements.

The map tile activator 32 may access the index of activated map tiles 34 for each of the map tiles in the index to compute respective confidence levels for the map tiles. The confidence level may be calculated from the value of the sensor data, the location for the sensor data, a timestamp for the sensor data, and a reference point in the respective map tile.

The reference point may be a specific point in each of the map tiles. Example reference points may include a centroid of the map tile or a directional portion of the map tile. The centroid may be the average location of all the points in the map tile. The centroid may be at the intersection of lines drawn from the edges or vertices of the map tile. The directional portion of the map tile may be the northwest corner, the northeast corner, the southwest corner, or the southeast corner. The direction portion of the map tile may be the north center side, the south center side, or another side of the map tile.

The map tile activator 32 computes the confidence value for each of the map tiles by adjusting the confidence values such that the confidence varies inversely with distance from the observing probe to the reference point in the map tile. In addition or in the alternative, the map tile activator 32 computes the confidence value for each of the map tiles by adjusting the confidence values such that the confidence varies inversely with the time that has elapsed since the measurement was taken. Thus, the confidence value may be a spatio-temporal quantity that varies with distance and time. Because the construction of the polygon described herein may be based on the confidence value, the polygon may also be a spatial-temporal quantity that varies in distance and time. Equation 1 demonstrates that the confidence value for a map tile varies inversely with distance and time.

$$\text{confidence value} = (1 - \exp(-a/x)) * (1 - \exp(-b/t)) \qquad \text{Eq. 1}$$

The value for x is distance between the location data of the sensor data and the reference point of the map tile. The value for t is the time elapsed between the timestamp of the sensor data and a current time. The exponential function, $\exp(z)$, is the value of e to the power of z, and e is the base of the natural logarithm, 2.718. The current time may be a system clock for the map tile activator 32 or the weather polygon controller 121. The current time may be a projected time for when the results of the weather polygon controller 121 would reach a display or a mobile device. The value for a is a distance decay factor. An example distance decay factor is 1.85. The value for b is a time decay factor. An example time decay factor is 7.5.

The map tile activator 32 or the weather polygon controller 121 is configured to compare the calculated confidence level to a threshold confidence level. The threshold confidence level may have any value (e.g., 0.5, 1.0, 1.5). The threshold confidence level may be selected according to the constants of Equation 1. As shown in FIG. 6, map tiles G and L were removed from the set of tiles (highlighted tiles that were pre-activated) because the confidence level for map tiles G and L was determined by the weather polygon controller 121 to be less than the threshold. The map tile activator 32 or the weather polygon controller 121 is configured to remove the map tile identifiers for map tiles G and L from the index of activated map tiles 34 in response to the respective confidence levels being less than the threshold confidence level.

The threshold confidence level may vary according to map data for the map tile. The map data may include the types of roads in the map tile, the topography or terrain of the map tile, the proximity to particular road features, and/or the elevation of the map tile.

When the threshold confidence is selected according to the type of terrain, the threshold confidence level may be increased for certain features. Features that trigger an increased confidence threshold level may include mountains, bodies of water, or other features that impact the weather. The weather polygon controller 121 may analyze the map data associated with a particular map tile and increase the threshold confidence level when any of these features are detected.

The threshold confidence level to minimize the existence of false positives while maximizing the detection of all weather events. If the threshold confidence level is too low, map tiles may be tagged when there is no significant weather event but instead only a mist or very light rain. If the threshold confidence level is too high, significant weather events are not detected. The threshold confidence level may be selectable over time.

In one embodiment, as vehicles 124 or mobile devices 122 report false positives, the threshold confidence level may be decreased to reduce the occurrence of false positives. Likewise, as vehicles 124 or mobile devices 122 report weather events that were not detected, the threshold confidence level may be increased to activate more map tiles in response to the measured observations. The weather polygon controller 121 may analyze data from one or more sensors for a false positive and adjust the confidence level for the at least one map tile based on the false positive. The analysis of the sensor data may alternatively occur in the pre-activation stage at act S103.

Figure 7:
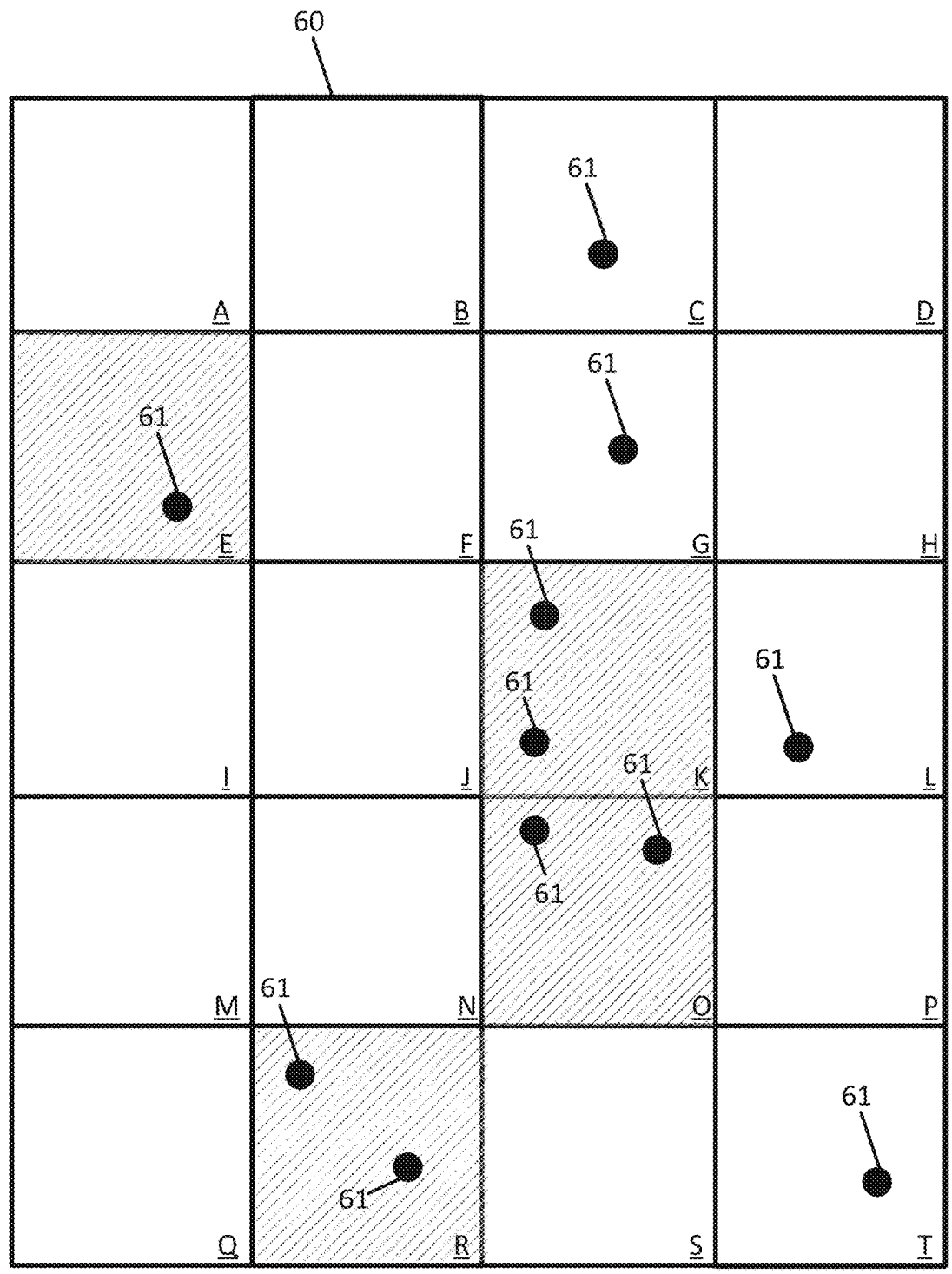
FIG. 7 illustrates an example clustering stage for the weather polygon controller of FIG. 2.

At act S107, the weather polygon controller 121 may activate remaining map tiles that are clustered together. FIG. 7 illustrates an example clustering stage for the weather polygon controller of FIG. 2. During clustering, the activated tiles listed in the index of activated map tiles 34 are analyzed using a clustering technique. Example clustering techniques include a density model of clustering such as density-based spatial clustering of applications with noise (DB-SCAN), a centroid model of clustering such as K-means clustering, a connectivity or connected set model of clustering such as hierarchical clustering, graph based clustering (e.g., JGraphT), or other examples.

In DB-SCAN clustering, given a set of measurements in the geographic region, the technique groups together measurements with locations that are near one another (i.e., high density regions) and designates as outliers those measurements that have fewer neighbors (i.e., low density regions). The DB-SCAN algorithm may be the faster for the data set. The outputted clusters at this stage are group of tiles that are both active and dense.

At act S109, the weather polygon controller 121 may perform clustering for the map tiles with confidence levels exceeding the threshold confidence level. Through the clustering technique one or more map tiles may be removed or omitted from the index of activated map tiles 34. In the example of FIG. 7, map tiles C and T are removed because map tiles C and T are not clustered with the remaining tiles. While not shown, map tiles C and T may be clustering with other clusters partially included in another geographic region or set of map tiles. In some examples, when all of the remaining map tiles are included in the cluster, no map tiles are removed or omitted in act S109.

Figure 8:
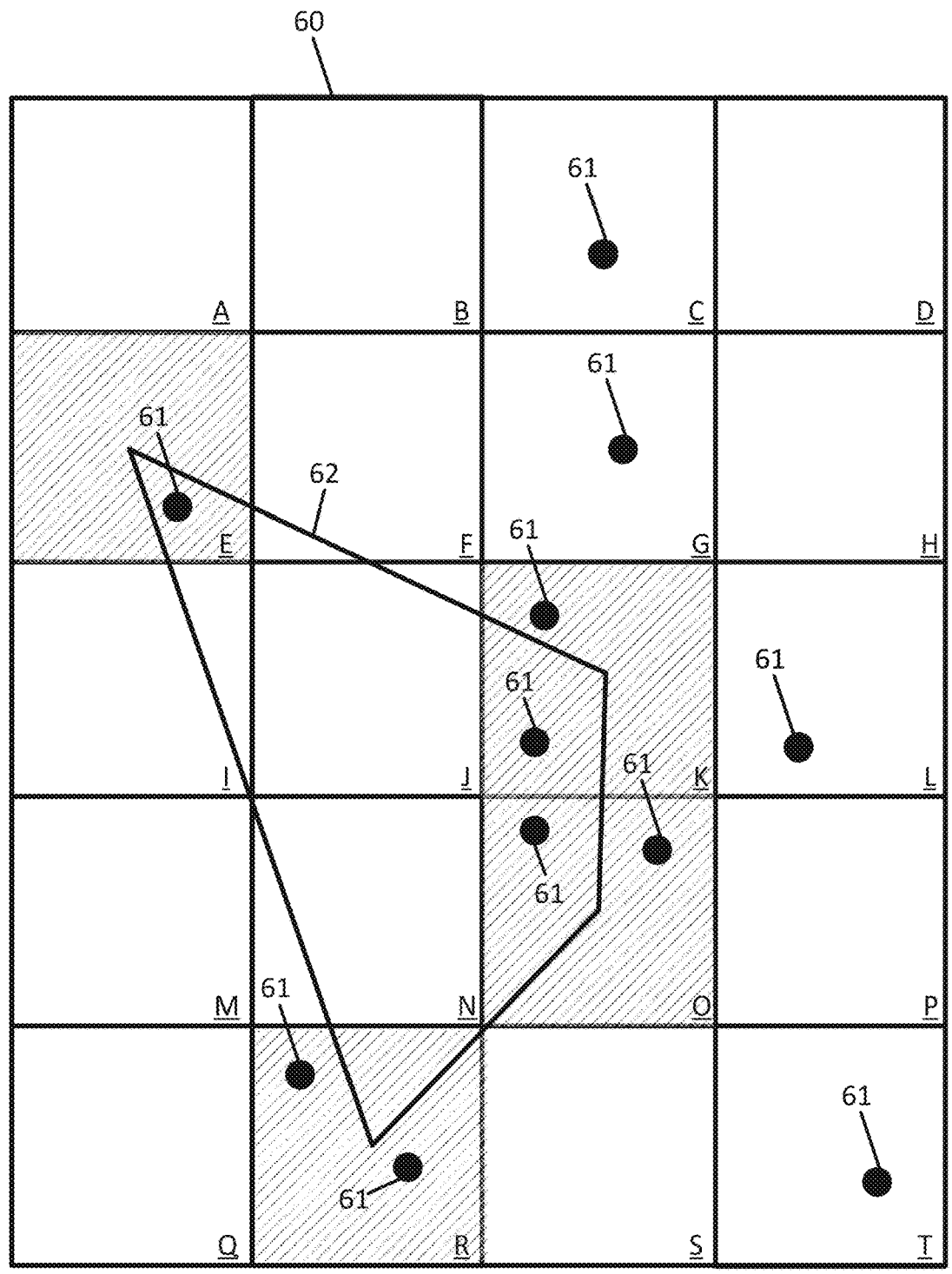
FIG. 8 illustrates an example polygon generation stage for the weather polygon controller of FIG. 2.

FIG. 8 illustrates an example polygon generation stage for the weather polygon controller of FIG. 2. At act S111, the weather polygon controller 121 through the polygon generator 35 may calculate a polygon 62 based on the map tile clusters that are listed in the index of activated map tiles 34. The weather polygon controller 121 is configured to calculate a concave representation of the polygon 62 based on points from the map tile cluster, or calculate a convex representation of the polygon 62 based on points from the map tile cluster. The polygon generator 35 may include one or more processors or integrated controllers configured to generate the polygon 62.

The polygon may be a geometric shape that is connected by drawing edges between vertices associated with the remaining map tiles. The polygon may be drawing to connect a designated point from the map tiles. The designated point may be the centroid, the northwest corner, the northeast corner, the southwest corner, or the southeast corner. The designated of the map tile may be the northern most point, the southern most point, the western most point, the eastern most point, or another point.

The polygon may be constructed from various techniques. Example techniques include the concave representation and the convex representation. For the concave representation the weather polygon controller 121 may identify the two closest designated points from the remaining map tiles. A line is drawn between those designated points. The next closest designated point is identified and a line is drawn from the closest of the two original points. This process, identifying the next closest point and drawing a line to it from an already included point, is repeated until all points are connected. No restrictions are made with respect to the angles between the lines. For the convex representation, a restriction is added to the angles between the lines. Here, the weather polygon controller 121 only connects points such that the lines remain within 180 degrees to 360 degrees. In this way, the resulting polygon is always convex. Through either technique, the weather polygon controller 121 may minimize the number of edges or lines making up the polygon.

Experiments have shown that the convex representation of the polygon is substantially faster than the concave representation. Specifically, since these polygons may ultimately be displayed in the vehicle's navigation system which traditionally have low computing resource, it is beneficial for the polygons to have as few edges as possible. Thus, convex polygon generation algorithm may be selected.

FIGS. 10A, 11A, 12A, and 13A illustrate examples of polygons 73 drawn using the concave representation. FIGS. 10B, 11B, 12B, and 13B illustrate examples of polygons 74 drawn using the convex representation.

Figure 9:
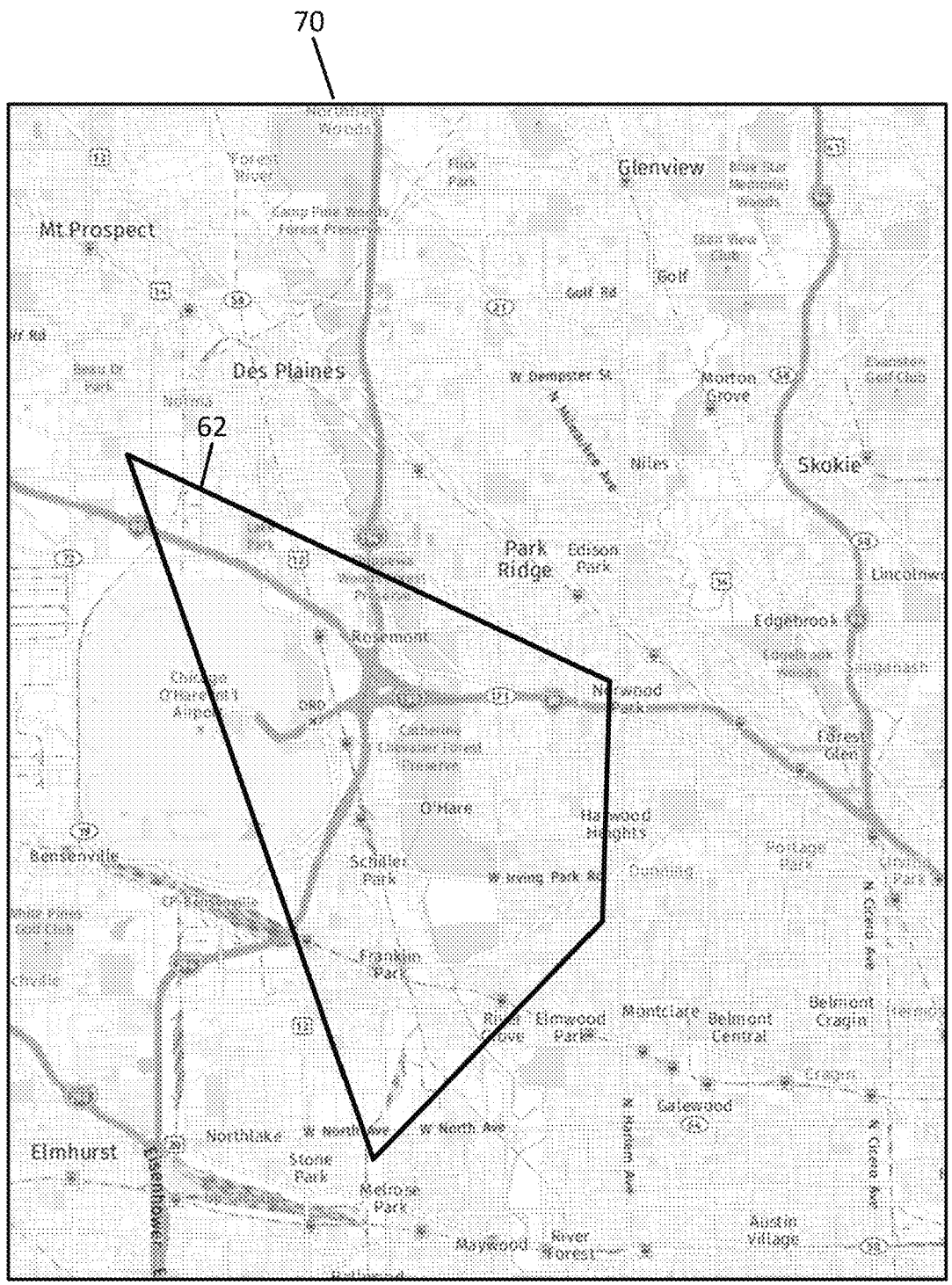
FIG. 9 illustrates an example output stage for the weather polygon controller of FIG. 2.
Figure 10A:
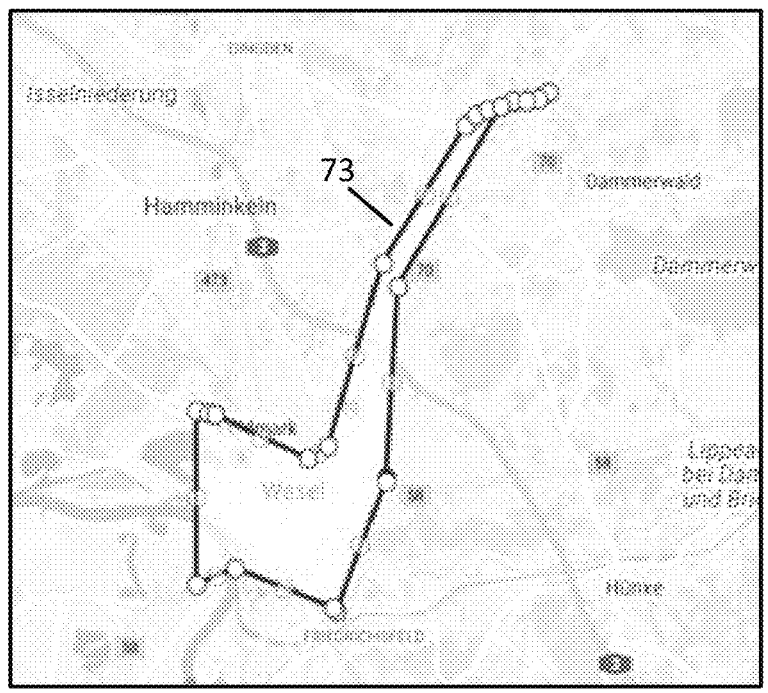
FIGS. 10A and 10B illustrate example polygon generation techniques.
Figure 10B:
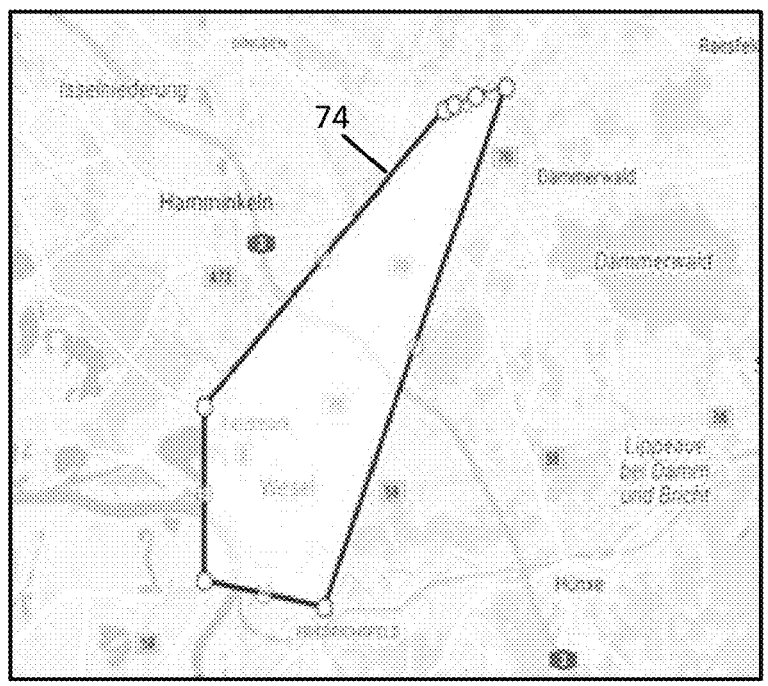
Figure 11A:
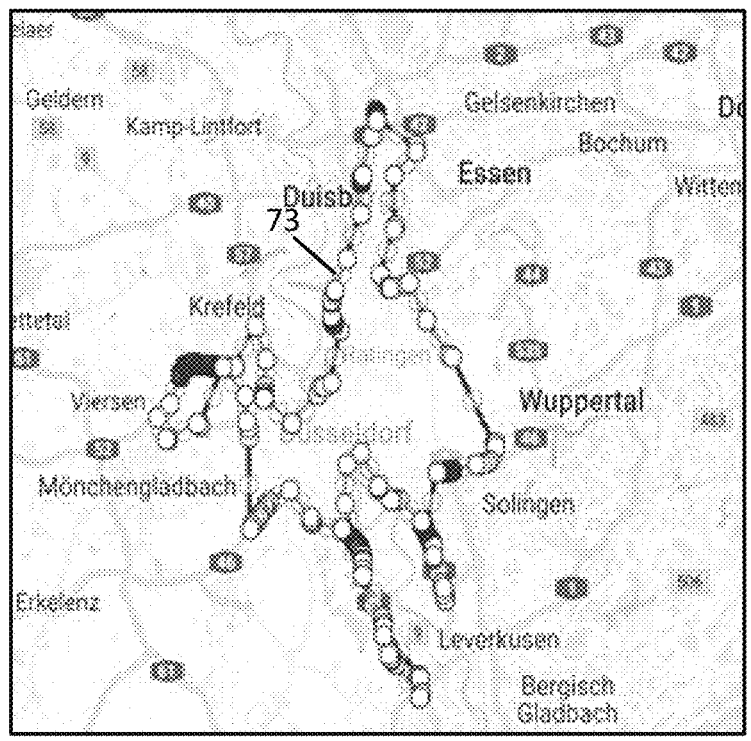
FIGS. 11A and 11B illustrate example polygon generation techniques.
Figure 11B:
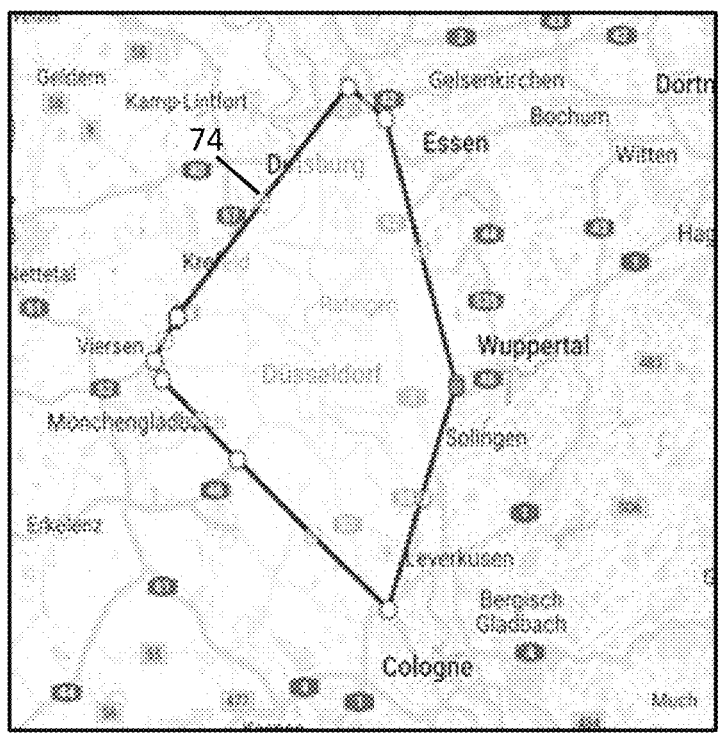
Figure 12A:
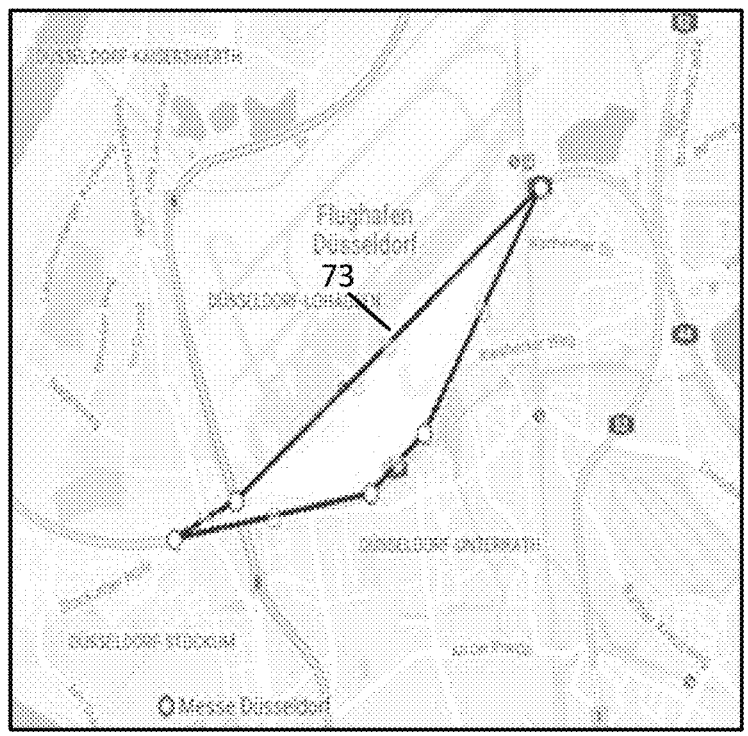
FIGS. 12A and 12B illustrate example polygon generation techniques.
Figure 12B:
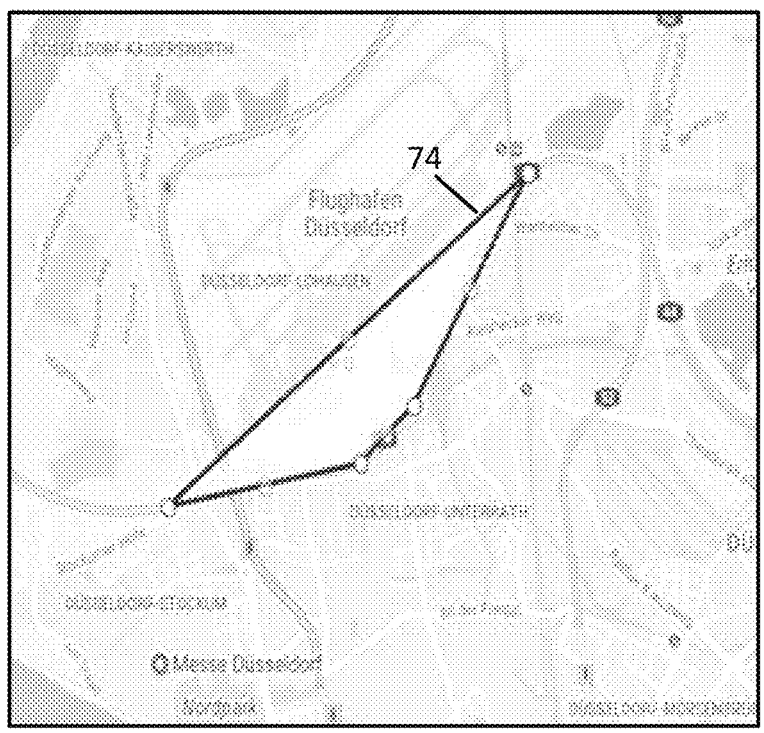
Figure 13A:
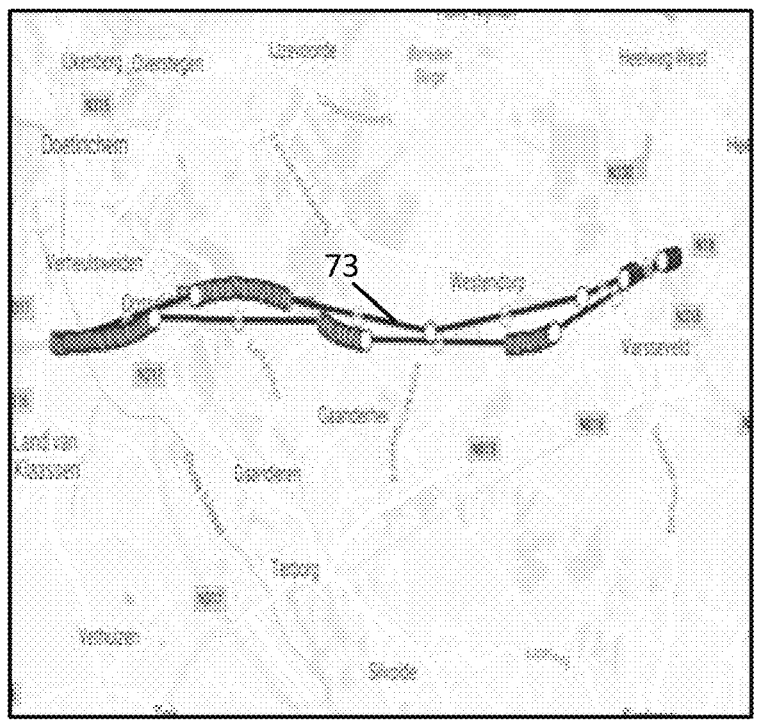
FIGS. 13A and 13B illustrate example polygon generation techniques.
Figure 13B:
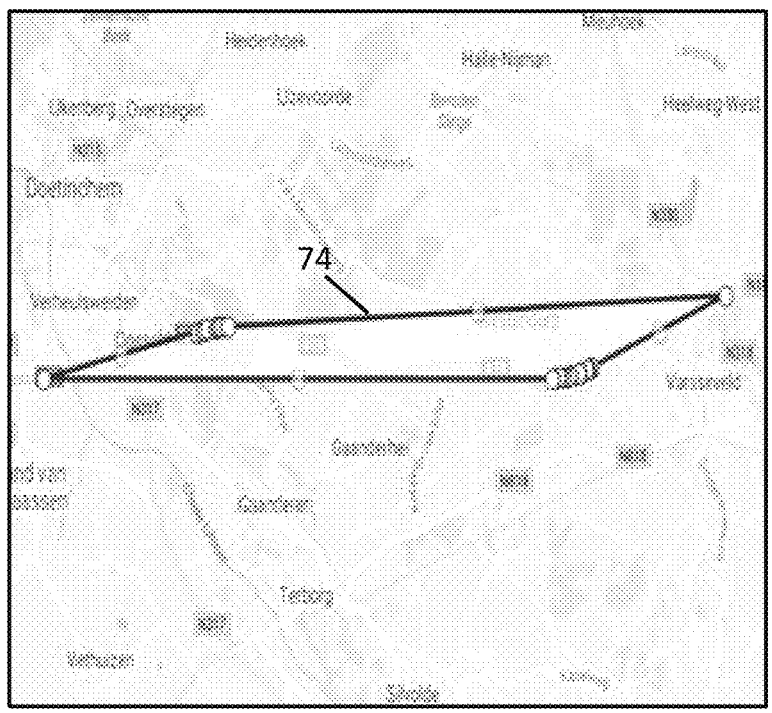

FIG. 9 illustrates an example output stage for the weather polygon controller of FIG. 2. The polygon 62 may be overlaid onto a map 70. At act S113, the weather polygon controller 121 may output the polygon 62 to a transmission channel that sends the polygon 62 to the external device 41. The weather polygon controller 121 is configured to generate the map 70 including the polygon and the geographic region. The map 70 corresponds to at least the map tiles remaining and may include all of the map tiles in the subset of map tiles from act S101.

The output of the polygon 62 may have various uses that provide technological improvements in several different fields. In one example, the external device 41 is a navigation system for one of the vehicles 124 that displays the map 70 and the polygon 62. The polygon 62 illustrates a weather event on the navigation system. A description of the weather event (e.g., rain, fog) may be display on the navigation system. A driver of the vehicle 124 may select a route in response to the weather event. The driver of the vehicle 124 may adjust a speed, change lanes, or exit a road in response to the weather event. To the extent that these polygons may be displayed at the head unit or dash cluster, which have low computing resources, the polygons 62 should have as few edges as possible. Other warnings or messages may be provided to the driver.

The external device 41 may include a transmission channel for a cloud service. The cloud service may provide map data in response to requests made by mobile device 122 or vehicles 124. The requests may include location data. When the location data includes an area within range of polygon 62, the weather polygon controller 121 by way of the external device 41 provides data indicative of the polygon 62 to the requesting device.

Figure 14:
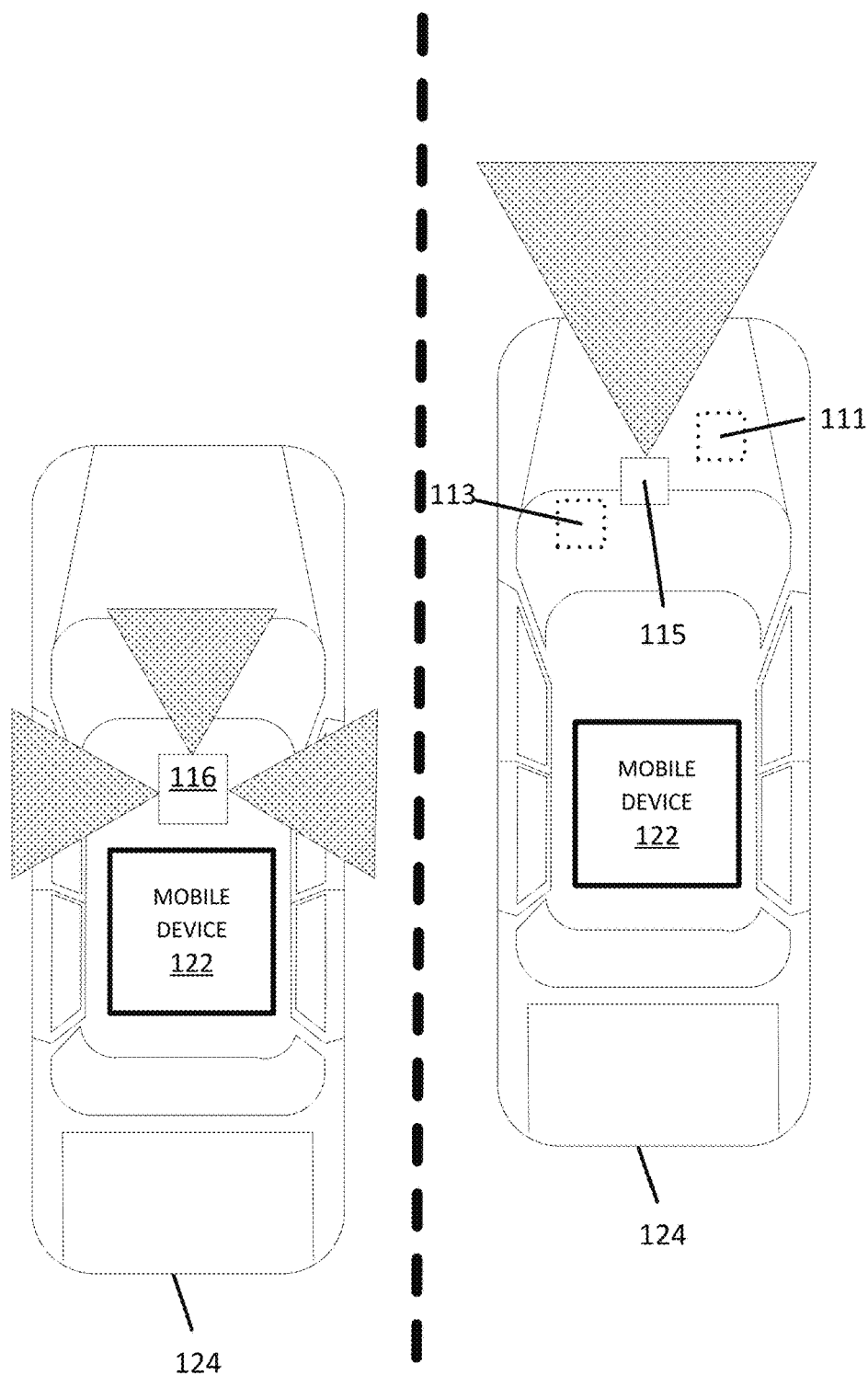
FIG. 14 illustrates an example array of sensors for a vehicle.

FIG. 14 illustrates an exemplary vehicle 124 of the systems of FIGS. 1-9. The vehicles 124 may include a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the vehicle 124. The positioning system may also include a receiver and correlation chip to obtain a GPS or GNSS signal. Alternatively or additionally, the one or more detectors or sensors may include an accelerometer built or embedded into or within the interior of the vehicle 124.

The vehicle 124 may include one or more distance data detection device or sensor, such as a light detection and ranging (LiDAR) device. The distance data detection sensor may generate point cloud data. The distance data detection sensor may include a laser range finder that rotates a mirror directing a laser to the surroundings or vicinity of the collection vehicle on a roadway or another collection device on any type of pathway. Other types of pathways may be substituted for the roadway in any embodiment described herein.

A connected vehicle includes a communication device and an environment sensor array for reporting the surroundings of the vehicle 124 to the server 125. The connected vehicle may include an integrated communication device coupled with an in-dash navigation system. The connected vehicle may include an ad-hoc communication device such as a mobile device 122 or smartphone in communication with a vehicle system. The communication device connects the vehicle to a network including at least one other vehicle and at least one server. The network may be the Internet or connected to the internet.

The sensor array may include one or more sensors configured to detect surroundings of the vehicle 124. The sensor array may include multiple sensors. Example sensors include an optical distance system such as LiDAR 116, an image capture system 115 such as a camera, a sound distance system such as sound navigation and ranging (SONAR), a radio distancing system such as radio detection and ranging (RADAR) or another sensor. The camera may be a visible spectrum camera, an infrared camera, an ultraviolet camera or another camera.

The sensor array configured to detect surroundings of the vehicle 124 may generate measurement data that describes a weather event. The probe data may include precipitation. Alternatively, the probe data may be analyzed to determine whether there is noise or distortion caused by the precipitation.

The weather events may include rain, fog, precipitation, snow conditions, ice conditions, or others. In some examples, the sensor data may be collected by vehicle sensors that detect the ambient environment of the vehicle 124. In other examples, the sensor data may be collected by vehicle sensors that detect the operation of one or more systems or features of the vehicle 124. The mobile device 122 or the weather polygon controller 121 may analyze the point cloud to determine if there is a weather event.

Additional sensors may be included in the vehicle 124. An engine sensor 111 may include a throttle sensor that measures a position of a throttle of the engine or a position of an accelerator pedal, a brake senor that measures a position of a braking mechanism or a brake pedal, or a speed sensor that measures a speed of the engine or a speed of the vehicle wheels.

The vehicle sensor 113 may include multiple sensors. Examples for the vehicle sensors 113 may include the fog light sensor (e.g., separate front fog light sensor and rear fog light sensor), a headlight sensor, a windshield wiper sensor, a heater sensor, a defrost sensor (e.g., separate front defrost and rear defrost), seat warmer sensor, side mirror windshield wiper sensor, rear windshield wiper sensor, or another sensor. The light sensors may determine when the lights are turned on or off and/or the intensity of the light. The windshield wiper sensor may determine when the windshield wipers are turned on or off, the speed of the windshield wipers, and/or an interval duration for the windshield wipers. The vehicle sensor 113 may detect when the respective system (e.g., light or wiper) is turned on by the user or by an automated driving system.

The vehicle sensors 113 may include a rain sensor, a thermometer, an ice sensor, a snow sensor, or another sensor for the ambient environment of the vehicle 124. The vehicle sensors 113 may detect a mechanical system of the vehicle 124 such as a steering wheel angle sensor, a speedometer sensor, or a tachometer sensor.

A mobile device 122 may be integrated in the vehicle 124, which may include assisted driving vehicles such as autonomous vehicles, highly assisted driving (HAD), and advanced driving assistance systems (ADAS). Any of these assisted driving systems may be incorporated into mobile device 122. Alternatively, an assisted driving device may be included in the vehicle 124. The assisted driving device may include memory, a processor, and systems to communicate with the mobile device 122. The assisted driving vehicles may respond to geographic data received from geographic database 123 and the server 125 and driving commands or navigation commands. The assisted driving vehicles may generate a warning or command in response to the weather polygon. The assisted driving vehicle may display, announce through a speaker, or otherwise provide a message to the user of the upcoming weather event based on the position of the vehicle 124 and/or the current driving or navigation commands. The message may include the type of the weather event, a distance to the weather event, and/or a suggested maneuver to increase safety with respect to the weather event.

In addition, ADAS vehicles include one or more partially automated systems in which the vehicle alerts the driver or assists the driver. The features are designed to avoid collisions automatically. Features may include adaptive cruise control, automate braking, or steering adjustments to keep the driver in the correct lane. The ADAS vehicle may modify settings for the adaptive cruise control, automate braking, or steering adjustments in response to the weather polygon. For example, the cruise control speed may be adjusted down, the braking distance threshold may be increased, and the deviation threshold for making steering adjustment may be decreased. ADAS vehicles may issue warnings for the driver based on the position of the vehicle or based on to geographic data received from geographic database 123 and the server 125 and driving commands or navigation commands.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes in response to the weather polygon. For example, transition from fully autonomous mode to partial autonomous mode with human intervention in response to the weather polygon. The autonomous vehicle may steer, brake, or accelerate the vehicle based on the position of the vehicle in order, and may respond to geographic data received from geographic database 123 and the server 125, driving commands or navigation commands, and/or in response to the weather polygon. The autonomous vehicle may generate a warning or other command in response to the weather polygon. The autonomous vehicle may modify driving commands or navigation commands based on the upcoming weather polygon. For example, the autonomous vehicle may reroute the vehicle in order to avoid, circumvent, or partially circumvent the weather polygon, or a predicted location of the weather polygon.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the on the position of the vehicle and may respond to geographic data received from geographic database 123 and the server 125 and driving commands or navigation commands. The HAD vehicle may control the steering or braking in response to the weather polygon. The HAD vehicle may reroute the vehicle in order to avoid, circumvent, or partially circumvent the weather polygon, or a predicted location of the weather polygon.

Figure 15:
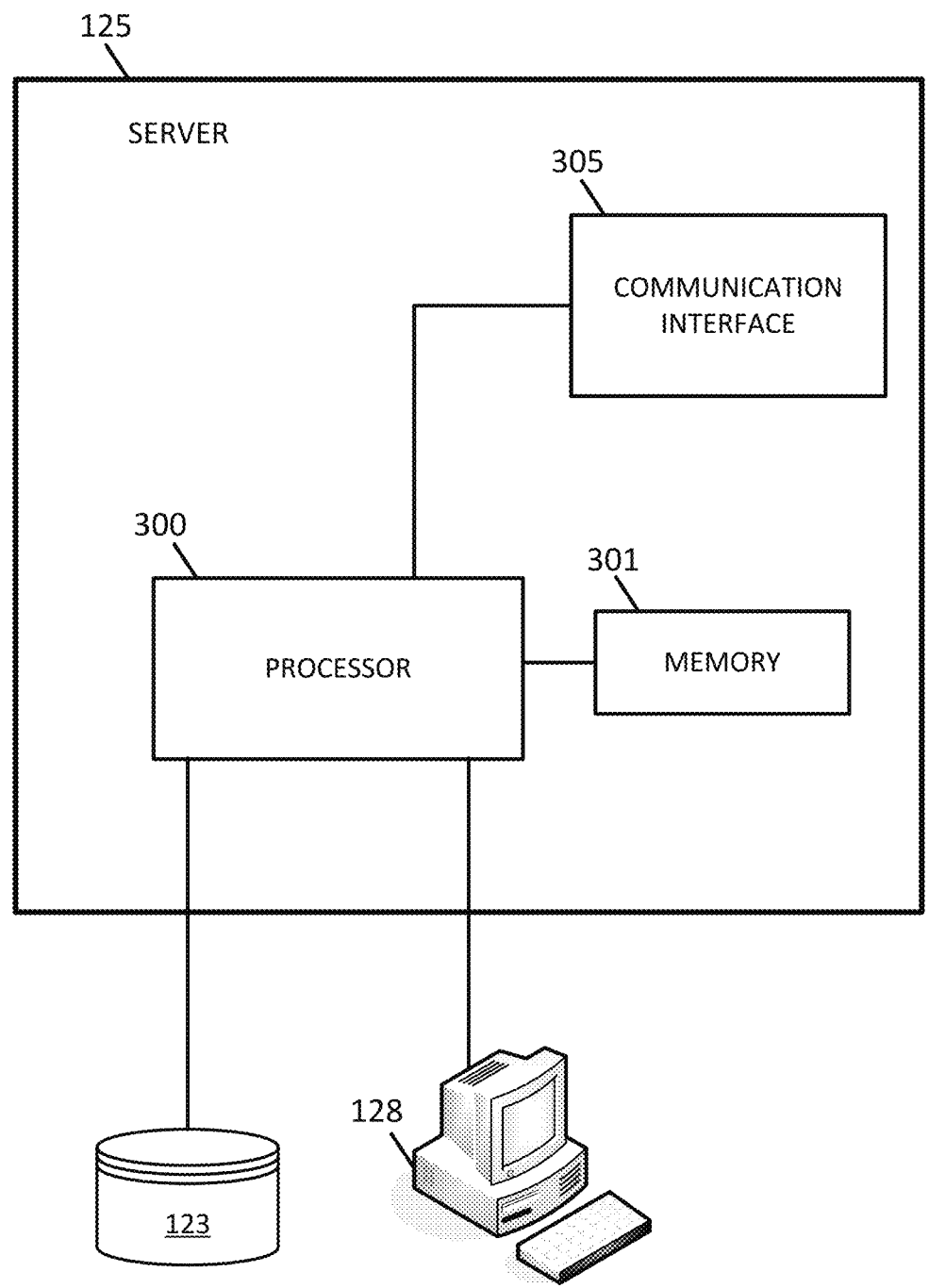
FIG. 15 illustrates an example server.

FIG. 15 illustrates an example server 125, which may apply to the system of FIG. 1. The server 125 includes a processor 300, a communication interface 305, a memory 301, and a database 123. The processor 300 may implement the functions associated with the map tile activator 32 and polygon generator 35 or otherwise the weather polygon controller 121. The communication interface 305 includes the functions associated with the input 30 and output 39. The communication interface 305 may facilitate the receipt of the probe data from the probes 101*a-n* as well as provide the protected probe data 33 to the external device 41. The memory 301 and/or database 123 includes the map tile database 31 and the index of activated map tiles 34. An input device (e.g., keyboard or personal computer 128) may be used to enter settings to the server 125. The settings may include settings for the confidence level threshold, the level of map tiles, and the predetermined distance for pre-activating the map tiles. Additional, different, or fewer components may be provided in the server 125.

The communication interface 305 may include circuitry serving as a means for receiving measurement data from one or more sensors associated with the geographic region. The processor 300 may includes circuitry serving as means for identifying at least one location from the measurement data. The processor 300 may include circuity serving as means for identifying at least one map tile within a predetermined distance to the at least one location. The processor 300 may include circuity serving as means for defining an index including the at least one map tile in response to identification that the at least one map tile is within the predetermined distance to the at least one location. The memory 301 may be a means for storing the index including the at least one map tile. The processor 300 may include circuity serving as means for calculating a confidence level for the at least one map tile accessed from the index. The processor 300 may include circuity serving as means for comparing the confidence level for the at least one map tile to a threshold confidence level. The processor 300 may include circuity serving as means for clustering the at least one map tile in a map tile cluster in response to the confidence level exceeding the threshold confidence level. The processor 300 may include circuity serving as means for calculating a polygon based on the map tile cluster, wherein the polygon intersects the geographic region.

In one example, the server 125 may maintain the geographic database 123 including data indicative of the weather polygons 62 indexed by geographic coordinates. A mobile device 122 may send requests for a subset of the geographic database 123 based on detected locations at the mobile device 122. Additionally or alternatively, the mobile device 122 may send requests for weather polygons from the geographic database 123 based on detected locations at the mobile device 122. The server 125 may query the geographic database 123 using the locations to retrieve the polygon 62 and return the polygon the mobile device 122. In other examples, the polygon 62 may be indexed by map tile or road segment, and the request from the mobile device may include an identifier for the map tile or road segment.

Figure 16:
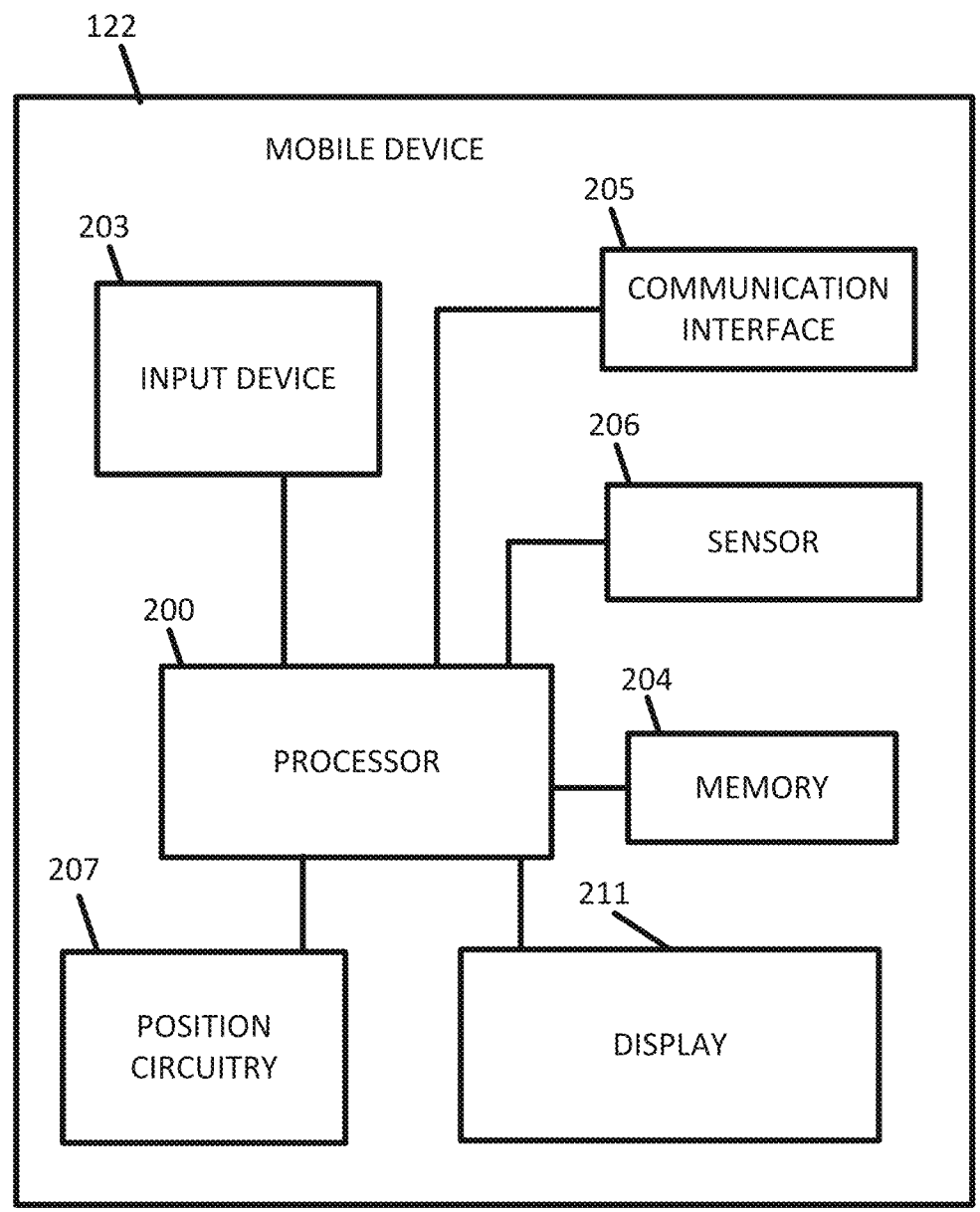
FIG. 16 illustrates an example mobile device.
Figure 17:
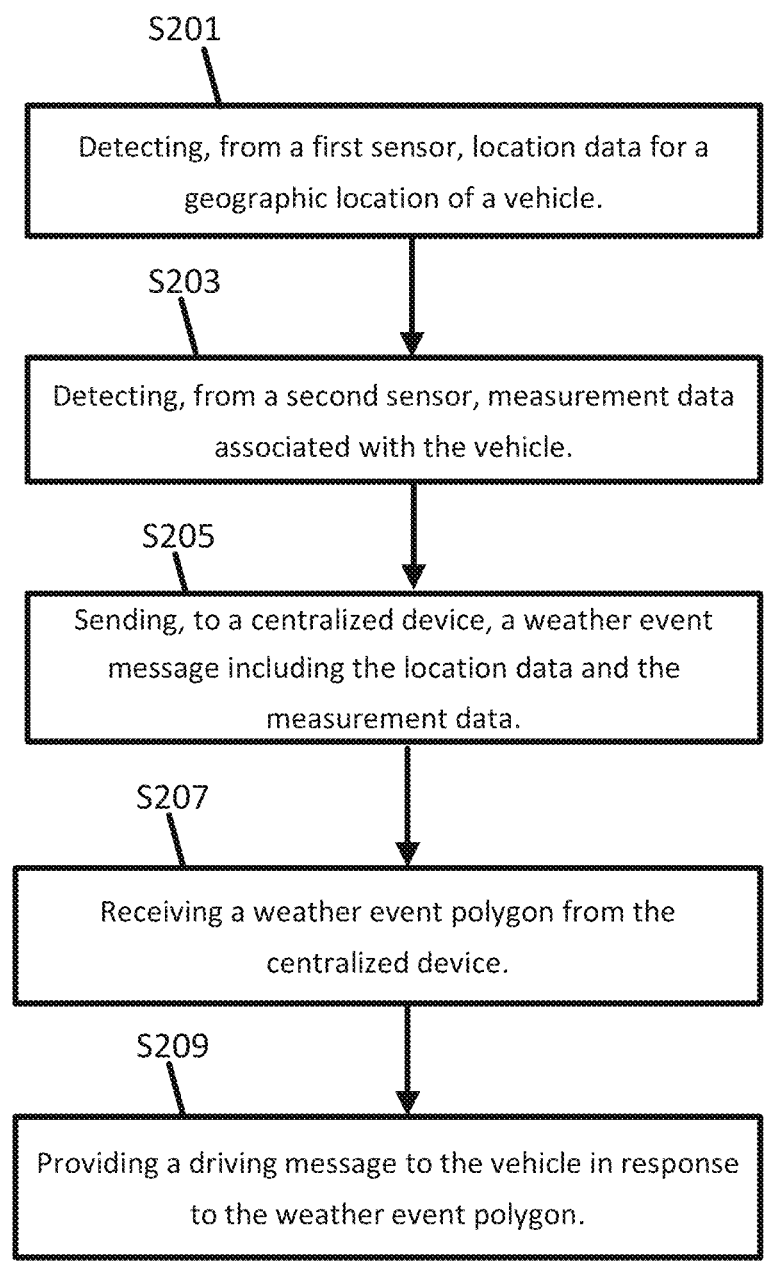
FIG. 17 illustrates an example flowchart for the mobile device of FIG. 16.
Figure 18:
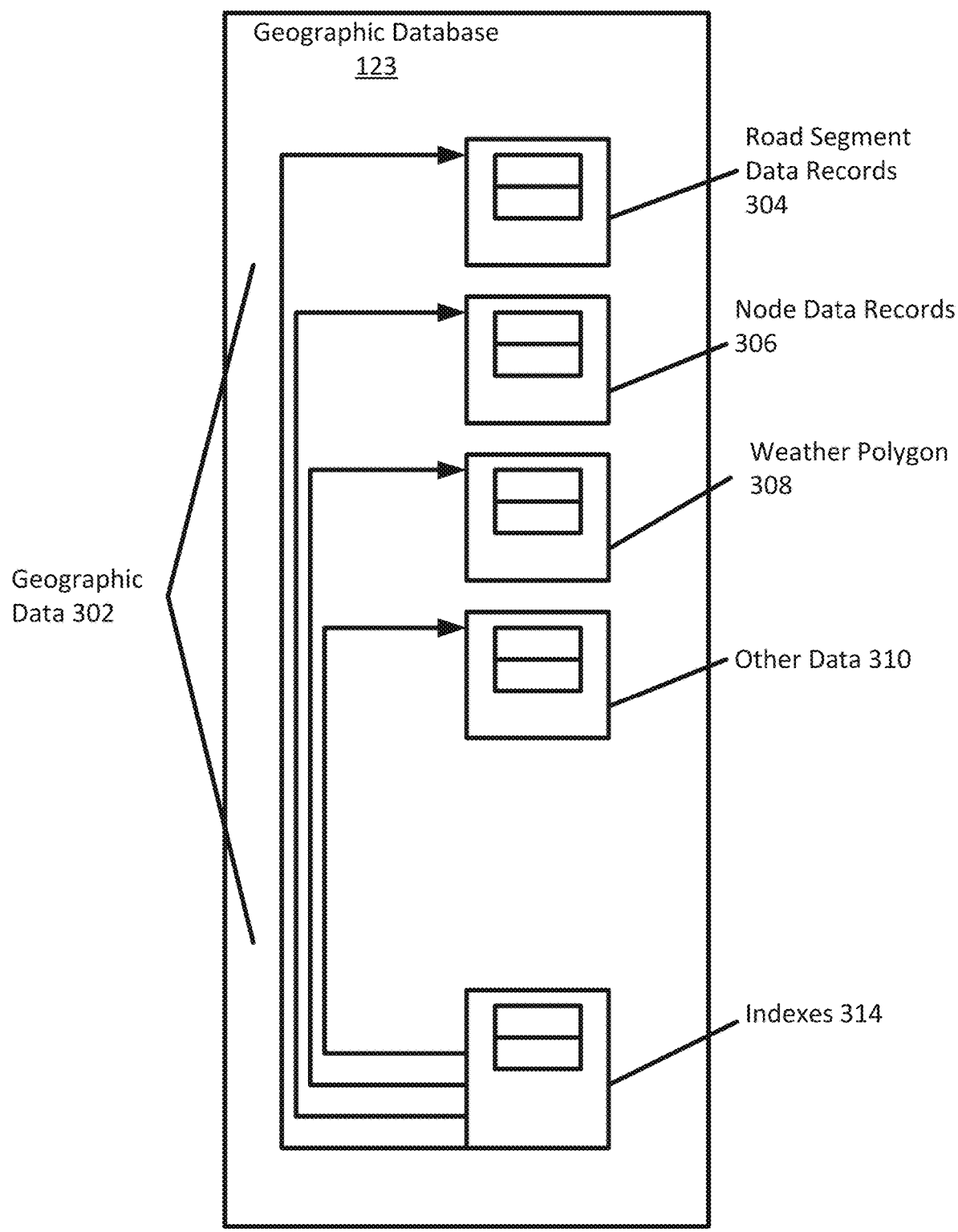
FIGS. 18 and 19 illustrate example geographic databases.
Figure 19:
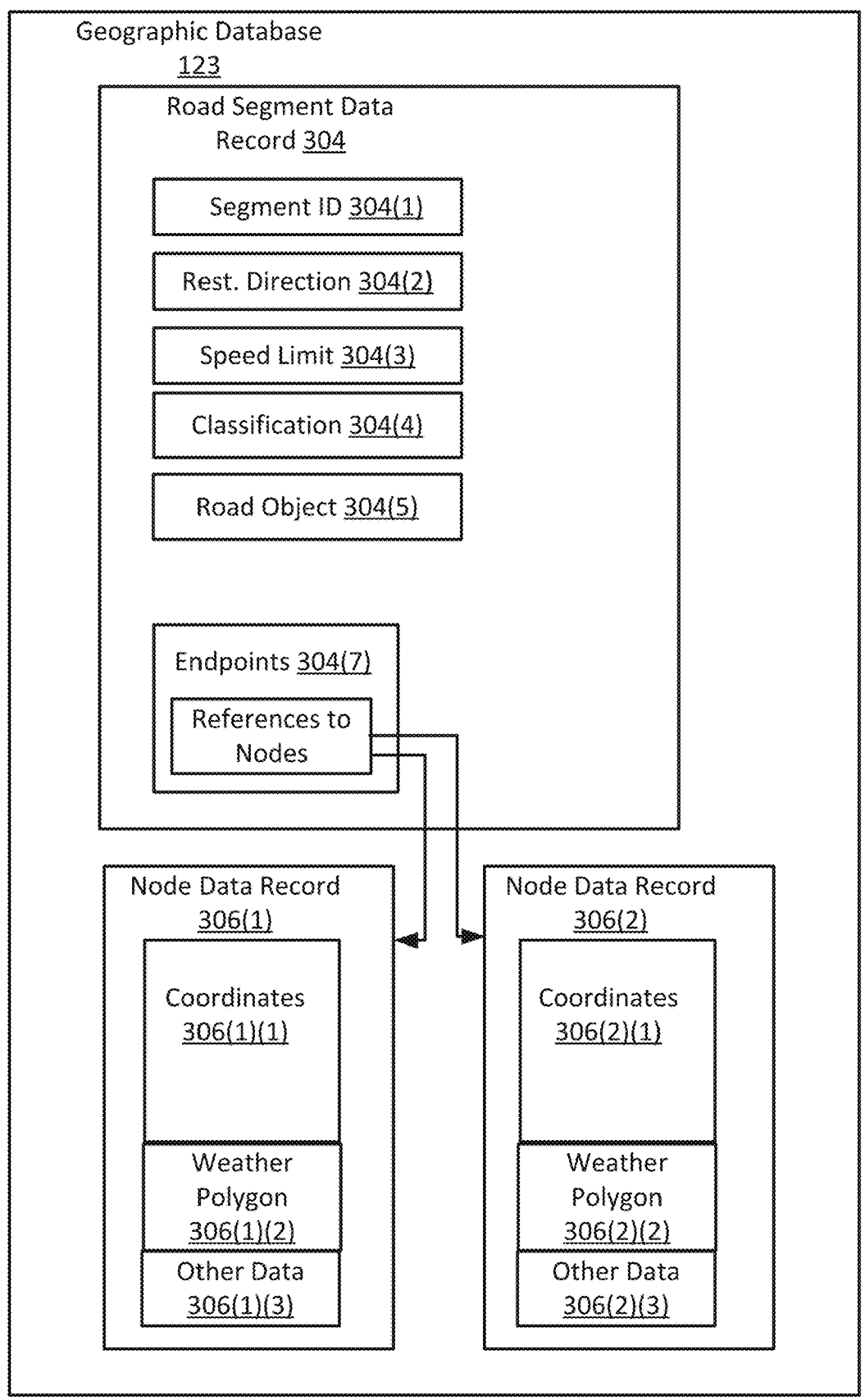

FIG. 16 illustrates an exemplary mobile device 122 of the system of FIG. 1. The mobile device 122 includes a processor 200, a memory 204, an input device 203, a communication interface 205, position circuitry 207, a display 211, and a sensor 206. The input device 203 may receive commands from the user for default settings for the weather polygon generation (e.g., the confidence level threshold, the level of map tiles, and the predetermined distance for pre-activating the map tiles). The processor 200 may communicate with a vehicle ECU which operates one or more driving mechanisms (e.g., accelerator, brakes, steering device). Alternatively, the mobile device 122 may be the vehicle ECU, which operates the one or more driving mechanisms directly. The sensor 206 may include any of the sensors described herein including a rain sensor, a windshield wiper sensor, a fog light sensor, a vehicle system sensor, or another example. Additional, different, or fewer components are possible for the mobile device 122.

FIG. 13 illustrates an example flowchart for the operation of mobile device 122. Additional, different, or fewer acts may be provided.

At act S201, the processor 200 or the communication interface 205 receives, using position circuitry 207 (a first sensor), location data for the geographic location for mobile device 122. The position circuitry 207 detects a geographic position of the mobile device 122 or the vehicle 124. The position circuitry 207 is one example means for detecting or determining a geographic position. The processor 200 may also include circuitry serving as means for detecting or determining a geographic position. The detected geographic position of the mobile device 122 may include a latitude and longitude pair. The geographic position may be detected or sampled at periodic intervals in time or distance or may be continuously detected.

At act S203, the processor 200 or the sensor 206 detects measurement data associated with the vehicle. The measurement data may include the operation of a vehicle subsystem such as the windshield wipers or the fog lights. The measurement data may describe the ambient environment of the vehicle 124 such as precipitation levels or temperature. The sensor 206 is an example means for detecting the vehicle subsystem data or the ambient environment data.

At act S205, the processor 200 or the communication interface 205 may send, to a centralized device, a weather event message including the location data and the measurement data. The centralized device may be the server 125 and/or a cloud data provider or map developer. The communication interface 205 may include circuitry as a means for sending the weather event message to the centralized device.

At act S207, the processor 200 or the communication interface 205 may receive a weather event polygon from the centralized device. The communication interface 205 may include circuitry as a means for receiving the weather event polygon. The weather event polygon may include a list of vertices as geographic coordinates for defining the weather event polygon. The weather event polygon may be defined according to any of the embodiments herein including a pre-activation technique that defines a list of map tiles within a predetermined distance of, or including, any observations described in S203. The weather event polygon may be defined according to a confidence level based on an analysis of the sensor data. The weather event polygon may be defined according to a clustering technique that groups map tiles based on their relative positions.

At act S209, the display 211 or another output device provides a driving message to the vehicle in response to the weather event polygon. The driving message includes a warning to a driver of the vehicle, a driving command for operation of the vehicle, or a map including the weather event polygon. The display 211 is an example means for providing the driving message in response to the weather event polygon.

The processor 200 may include a routing module including an application specific module or integrated circuit that calculates routing between an origin and destination. The routing module is an example means for generating a route or a routing command in response to the weather polygon. The route may circumvent or otherwise be altered in response to the weather polygon. The routing command may be a driving instruction (e.g., turn left, go straight), which may be presented to a driver or passenger, or sent to an assisted driving system. The display 211 is an example means for displaying the routing command.

The routing instructions may be provided by display 211. The mobile device 122 may be configured to execute routing algorithms to determine an optimum route to travel along a road network from an origin location to a destination location in a geographic region. Using input(s) including map matching values from the server 125, a mobile device 122 examines potential routes between the origin location and the destination location to determine the optimum route. The mobile device 122, which may be referred to as a navigation device, may then provide the end user with information about the optimum route in the form of guidance that identifies the maneuvers required to be taken by the end user to travel from the origin to the destination location. Some mobile devices 122 show detailed maps on displays outlining the route, the types of maneuvers to be taken at various locations along the route, locations of certain types of features, and so on. Possible routes may be calculated based on a Dijkstra method, an A-star algorithm or search, and/or other route exploration or calculation algorithms that may be modified to take into consideration assigned cost values of the underlying road segments.

The mobile device 122 may plan a route through a road system or modify a current route through a road system in response to the request for additional observations of the road object. For example, when the mobile device 122 determines that there are two or more alternatives for the optimum route and one of the routes passes the initial observation point, the mobile device 122 selects the alternative that passes the initial observation point. The mobile devices 122 may compare the optimal route to the closest route that passes the initial observation point. In response, the mobile device 122 may modify the optimal route to pass the initial observation point.

The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

In FIG. 14, the geographic database 123 may contain at least one road segment database record 304 (also referred to as "entity" or "entry") for each road segment in a particular geographic region. The geographic database 123 may also include a node database record 306 (or "entity" or "entry") for each node in a particular geographic region. The terms "nodes" and "segments" represent only one terminology for describing these physical geographic features, and other terminology for describing these features is intended to be encompassed within the scope of these concepts. The geographic database 123 may also include location fingerprint data for specific locations in a particular geographic region.

The geographic database 123 may include other kinds of data 310. The other kinds of data 310 may represent other kinds of geographic features or anything else. The other kinds of data may include POI data. For example, the POI data may include POI records comprising a type (e.g., the type of POI, such as restaurant, hotel, city hall, police station, historical marker, ATM, golf course, etc.), location of the POI, a phone number, hours of operation, etc.

The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304.

As another example, the indexes 314 may relate weather polygon data 308 with a road segment in the segment data records 304 or a geographic coordinate. An index 314 may, for example, store the weather polygon data 308 relating to one or more locations for boundaries of one or more weather polygons. The weather polygon data 308 may include a list of road segments, nodes, or geographic coordinates for the weather polygon.

The geographic database 123 may also include other attributes of or about roads such as, for example, geographic coordinates, physical geographic features (e.g., lakes, rivers, railroads, municipalities, etc.) street names, address ranges, speed limits, turn restrictions at intersections, and/or other navigation related attributes (e.g., one or more of the road segments is part of a highway or toll way, the location of stop signs and/or stoplights along the road segments), as well as POIs, such as gasoline stations, hotels, restaurants, museums, stadiums, offices, automobile dealerships, auto repair shops, buildings, stores, parks, municipal facilities, other businesses, etc. The geographic database 123 may also contain one or more node data record(s) 306 which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data 302 may additionally or alternatively include other data records such as, for example, POI data records, topographical data records, cartographic data records, routing data, and maneuver data. Other contents of the database 123 may include temperature, altitude or elevation, lighting, sound or noise level, humidity, atmospheric pressure, wind speed, the presence of magnetic fields, electromagnetic interference, or radio- and micro-waves, cell tower and wi-fi information, such as available cell tower and wi-fi access points, and attributes pertaining to specific approaches to a specific location.

The geographic database 123 may include historical traffic speed data for one or more road segments. The geographic database 123 may also include traffic attributes for one or more road segments. A traffic attribute may indicate that a road segment has a high probability of traffic congestion.

FIG. 15 shows some of the components of a road segment data record 304 contained in the geographic database 123 according to one embodiment. The road segment data record 304 may include a segment ID 304(1) by which the data record can be identified in the geographic database 123. Each road segment data record 304 may have associated with it information (such as "attributes", "fields", etc.) that describes features of the represented road segment. The road segment data record 304 may include data 304(2) that indicate the restrictions, if any, on the direction of vehicular travel permitted on the represented road segment. The road segment data record 304 may include data 304(3) that indicate a speed limit or speed category (i.e., the maximum permitted vehicular speed of travel) on the represented road segment. The road segment data record 304 may also include classification data 304(4) indicating whether the represented road segment is part of a controlled access road (such as an expressway), a ramp to a controlled access road, a bridge, a tunnel, a toll road, a ferry, and so on. The road segment data record may include location fingerprint data, for example a set of sensor data for a particular location.

The geographic database 123 may include road segment data records 304 (or data entities) that describe features such as road objects 304(5). The road objects 304(5) may be stored according to location boundaries or vertices. The road objects 304(5) may be stored as a field or record using a scale of values such as from 1 to 100 for type or size. The road objects may be stored using categories such as low, medium, or high. Additional schema may be used to describe the road objects. The attribute data may be stored in relation to a link/segment 304, a node 306, a strand of links, a location fingerprint, an area, or a region. The geographic database 123 may store information or settings for display preferences. The geographic database 123 may be coupled to a display. The display may be configured to display the roadway network and data entities using different colors or schemes.

The road segment data record 304 also includes data 304(7) providing the geographic coordinates (e.g., the latitude and longitude) of the end points of the represented road segment. In one embodiment, the data 304(7) are references to the node data records 306 that represent the nodes corresponding to the end points of the represented road segment.

The road segment data record 304 may also include or be associated with other data 304(7) that refer to various other attributes of the represented road segment. The various attributes associated with a road segment may be included in a single road segment record, or may be included in more than one type of record which cross-references to each other. For example, the road segment data record 304 may include data identifying what turn restrictions exist at each of the nodes which correspond to intersections at the ends of the road portion represented by the road segment, the name, or names by which the represented road segment is identified, the street address ranges along the represented road segment, and so on.

FIG. 15 also shows some of the components of a node data record 306 that may be contained in the geographic database 123. Each of the node data records 306 may have associated information (such as "attributes", "fields", etc.) that allows identification of the road segment(s) that connect to it and/or its geographic position (e.g., its latitude and longitude coordinates). The node data records 306(1) and 306(2) include the latitude and longitude coordinates 306(1)(1) and 306(2)(1) for their node, and weather polygon 306(1)(2) and 306(2)(2), which may include boundaries of the weather polygon, or road segments or nodes defining the weather polygons. The weather polygons 306 (1)(2) and 306(2)(2) may change dynamically or over time. The node data records 306(1) and 306(2) may also include other data 306(1)(3) and 306(2)(3) that refer to various other attributes of the nodes.

The geographic database 123 may be maintained by a content provider (e.g., a map developer). By way of example, the map developer may collect geographic data to generate and enhance the geographic database 123. The map developer may obtain data from sources, such as businesses, municipalities, or respective geographic authorities. In addition, the map developer may employ field personnel to travel throughout a geographic region to observe features and/or record information about the roadway. Remote sensing, such as aerial or satellite photography, may be used. The database 123 may be incorporated in or connected to the server 125.

The geographic database 123 and the data stored within the geographic database 123 may be licensed or delivered on-demand. Other navigational services or traffic server providers may access the location fingerprint data, traffic data and/or the lane line object data stored in the geographic database 123.

The processor 200 and/or processor 300 may include a general processor, digital signal processor, an application specific integrated circuit (ASIC), field programmable gate array (FPGA), analog circuit, digital circuit, combinations thereof, or other now known or later developed processor. The processor 200 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 801 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The databases 123 may include geographic data used for traffic and/or navigation-related applications. The geographic data may include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may include structured cartographic data or pedestrian routes.

The databases may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The databases may include historical traffic speed data for one or more road segments. The databases may also include traffic attributes for one or more road segments. A traffic attribute may indicate that a road segment has a high probability of traffic congestion.

The input device 203 may be one or more buttons, keypad, keyboard, mouse, stylus pen, trackball, rocker switch, touch pad, voice recognition circuit, or other device or component for inputting data to the mobile device 122. The input device 203 and display 211 may be combined as a touch screen, which may be capacitive or resistive. The display 211 may be a liquid crystal display (LCD) panel, light emitting diode (LED) screen, thin film transistor screen, or another type of display. The output interface of the display 211 may also include audio capabilities, or speakers. In an embodiment, the input device 203 may involve a device having velocity detecting abilities.

The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 207 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The following example embodiments of the invention are also disclosed:

Embodiment 1

A method for generating warning polygons for weather events in a geographic region, the method comprising:

receiving measurement data from one or more sensors associated with the geographic region;

identifying at least one location from the measurement data;

identifying at least one map tile within a predetermined distance to the at least one location;

defining an index including the at least one map tile in response to identification that the at least one map tile is within the predetermined distance to the at least one location;

calculating, by a processor, a confidence level for the at least one map tile accessed from the index;

comparing, by the processor, the confidence level for the at least one map tile to a threshold confidence level;

clustering the at least one map tile in a map tile cluster in response to the confidence level exceeding the threshold confidence level; and calculating, by the processor, a polygon based on the map tile cluster, wherein the polygon intersects the geographic region.

Embodiment 2

The method of embodiment 1, further comprising:
calculating a centroid of the at least one map tile, wherein the confidence level is for the centroid of the at least one map tile.

Embodiment 3

The method of any of embodiments 1 and 2,
generating a map including the polygon and the geographic region.

Embodiment 4

The method of any of embodiments 1-3, further comprising:
generating a driving command in response to the polygon.

Embodiment 5

The method of any of embodiments 1-4, wherein the one or more sensors are one or more vehicle sensors.

Embodiment 6

The method of any of embodiments 1-5, wherein the one or more sensors includes a wiper sensor or a fog light sensor.

Embodiment 7

The method of any of embodiments 1-6, further comprising:
analyzing data from one or more sensors for a false positive; and adjusting the confidence level for the at least one map tile based on the false positive.

Embodiment 8

The method of any of embodiments 1-7, wherein calculating the polygon comprises:
calculating a concave representation of the polygon based on points from the map tile cluster, or
calculating a convex representation of the polygon based on points from the map tile cluster.

Embodiment 9

The method of any of embodiments 1-8, further comprising:
outputting the polygon in association with a warning of a weather event.

Embodiment 10

The method of any of embodiments 1-9, wherein the weather event includes rain or fog.

Embodiment 11

An apparatus, configured to perform and/or control the method of any of embodiments 1-10 or comprising means for performing and/or controlling any of embodiments 1-10.

Embodiment 12

An apparatus, comprising at least one processor and at least one memory including computer program code for one or more programs, the at least one memory and the computer program code configured to, with the at least one processor, to perform and/or control the method of any of embodiments 1-10.

Embodiment 13

A computer program comprising instructions operable to cause a processor to perform and/or control the method of any of embodiments 1-10, when the computer program is executed on the processor.

I claim:

1. A method for generating warning polygons for weather events in a geographic region, the method comprising:
    receiving measurement data from one or more sensors associated with the geographic region;
    identifying at least one location from the measurement data;
    identifying at least one map tile within a predetermined distance to the at least one location;
    defining an index including the at least one map tile in response to identification that the at least one map tile is within the predetermined distance to the at least one location;
    calculating, by a processor, a confidence level for the at least one map tile accessed from the index;
    comparing, by the processor, the confidence level for the at least one map tile to a threshold confidence level;
    clustering the at least one map tile in a map tile cluster in response to the confidence level exceeding the threshold confidence level; and
    calculating, by the processor, a polygon based on the map tile cluster, wherein the polygon intersects the geographic region.

2. The method of claim 1, further comprising:
    calculating a centroid of the at least one map tile, wherein the confidence level is a confidence level for the centroid of the at least one map tile.

3. The method of claim 1, further comprising:
    generating a map including the polygon and the geographic region.

4. The method of claim 1, further comprising:
    generating a driving command in response to the polygon.

5. The method of claim 1, the method comprising:
    analyzing data from one or more sensors for a false positive; and
    adjusting the confidence level for the at least one map tile based on the false positive.

6. The method of claim 1, wherein calculating the polygon comprises:
    calculating a concave representation of the polygon based on points from the map tile cluster, or
    calculating a convex representation of the polygon based on points from the map tile cluster.

7. The method of claim 1, wherein the one or more sensors are one or more vehicle sensors.

8. The method of claim 7, wherein the one or more sensors includes a wiper sensor or a fog light sensor.

9. The method of claim 1, further comprising:
    outputting the polygon in association with a warning of a weather event.

10. The method of claim 9, wherein the weather event includes rain or fog.

11. An apparatus for generating warning polygons for weather events in a geographic region, the apparatus comprising:

a map tile database configured to store partitions of map data according to an index of a plurality of map tile identifiers;

an input configured to receive measurement data from one or more sensors associated with the geographic region;

a map tile activator configured to identify at least one location from the measurement data and activate at least one map tile within a predetermined distance to the at least one location, wherein the activated at least one map data tile is indexed using a corresponding one of the plurality of map tile identifiers; and a controller configured to calculate a confidence level for the at least one map tile accessed from the index and calculate a polygon for a weather event in response to the confidence level, wherein the polygon for the weather event intersects the geographic region.

12. The apparatus of claim 11, wherein the controller is configured to compare the confidence level for the at least one map tile to a threshold confidence level.

13. The apparatus of claim 12, wherein the controller is configured to modify the confidence level based on a terrain feature of the at least one map tile.

14. The apparatus of claim 12, wherein the controller is configured to cluster the at least one map tile in a map tile cluster in response to the confidence level exceeding the threshold confidence level.

15. The apparatus of claim 11, wherein the controller is configured to generate a driving command in response to the polygon.

16. The apparatus of claim 15, wherein the driving command controls operation of an automated vehicle.

17. The apparatus of claim 15, wherein the driving command includes a warning for a driver of a vehicle.

18. A non-transitory computer readable medium including instructions that when executed cause a processor to perform:

detecting, from a first sensor, location data for a geographic location of a vehicle;

detecting, from a second sensor, measurement data associated with the vehicle;

sending, to a centralized device, a weather event message including the location data and the measurement data;

receiving a weather event polygon from the centralized device, wherein the weather event polygon is based on a cluster of map tiles from an index selected based on the location data and a confidence level; and providing a driving message to the vehicle in response to the weather event polygon.

19. The non-transitory computer readable medium of claim 18, wherein the driving message includes a warning to a driver of the vehicle, a driving command for operation of the vehicle, or a map including the weather event polygon.

* * * * *